United States Patent [19]

Brush et al.

[11] Patent Number: 4,867,685

[45] Date of Patent: Sep. 19, 1989

[54] AUDIO VISUAL INSTRUCTIONAL SYSTEM

[75] Inventors: George W. Brush, Maywood, N.J.; Lee T. Strickland, Great Neck, N.Y.; David C. Hon, Seattle, Wash.; Ronald E. Harding, Seattle, Wash.; Jane Sallis, Seattle, Wash.

[73] Assignee: The Trustees of the College of Aeronautics, Jackson Heights, N.Y.

[21] Appl. No.: 100,774

[22] Filed: Sep. 24, 1987

[51] Int. Cl.⁴ ............................................. G09B 19/24
[52] U.S. Cl. .................................................. 434/234
[58] Field of Search ......................................... 434/234

[56] References Cited

U.S. PATENT DOCUMENTS 4,680,014 7/1987 Paton et al. ......................... 434/234

Primary Examiner—Leo P. Picard
Attorney, Agent, or Firm—Brumbaugh, Graves, Donohue & Raymond

[57] ABSTRACT

A tool-workpiece instructional system is provided for simulating operation on a workpiece in the form of a welding site as shown on a display, by a student using a tool such as a welding torch simulator. The torch is a mock-up of as real torch, having mock values and torch tip, but is not supplied with any gas. A light pen and mercury switches are mounted inside to detect torch position and angular position relative to the display. A computer with a control program uses information regarding parameters of torch location relative to the display, including torch angle, torch distance to the display, torch position as projected on the plane of the display, welding rod position (as detected by a touch screen on top of the display) and oxygen and acetylene valve positions of the welding torch, and uses the parameters to determine what would happen to a welding site during a real weld and addresses appropriate segments in a video disc player to display a simulation of the welding site in real time.

14 Claims, 26 Drawing Sheets

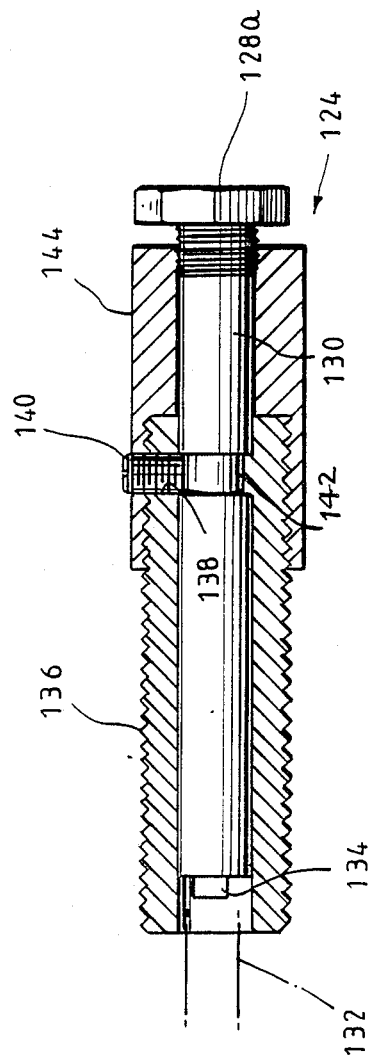
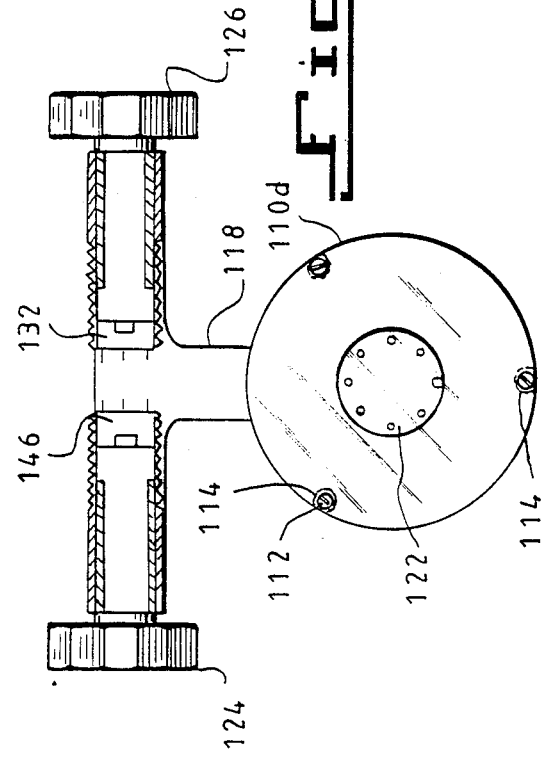

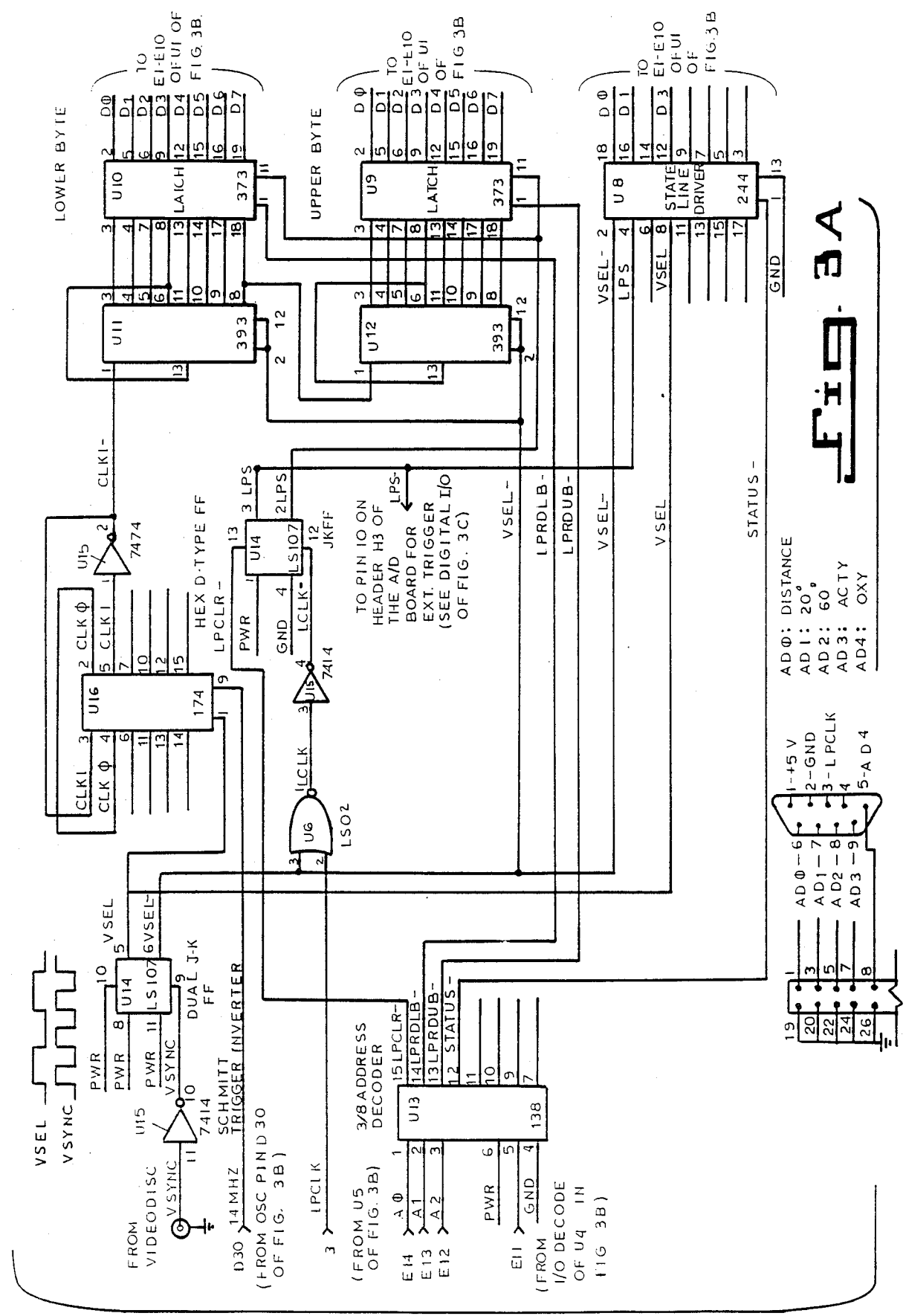

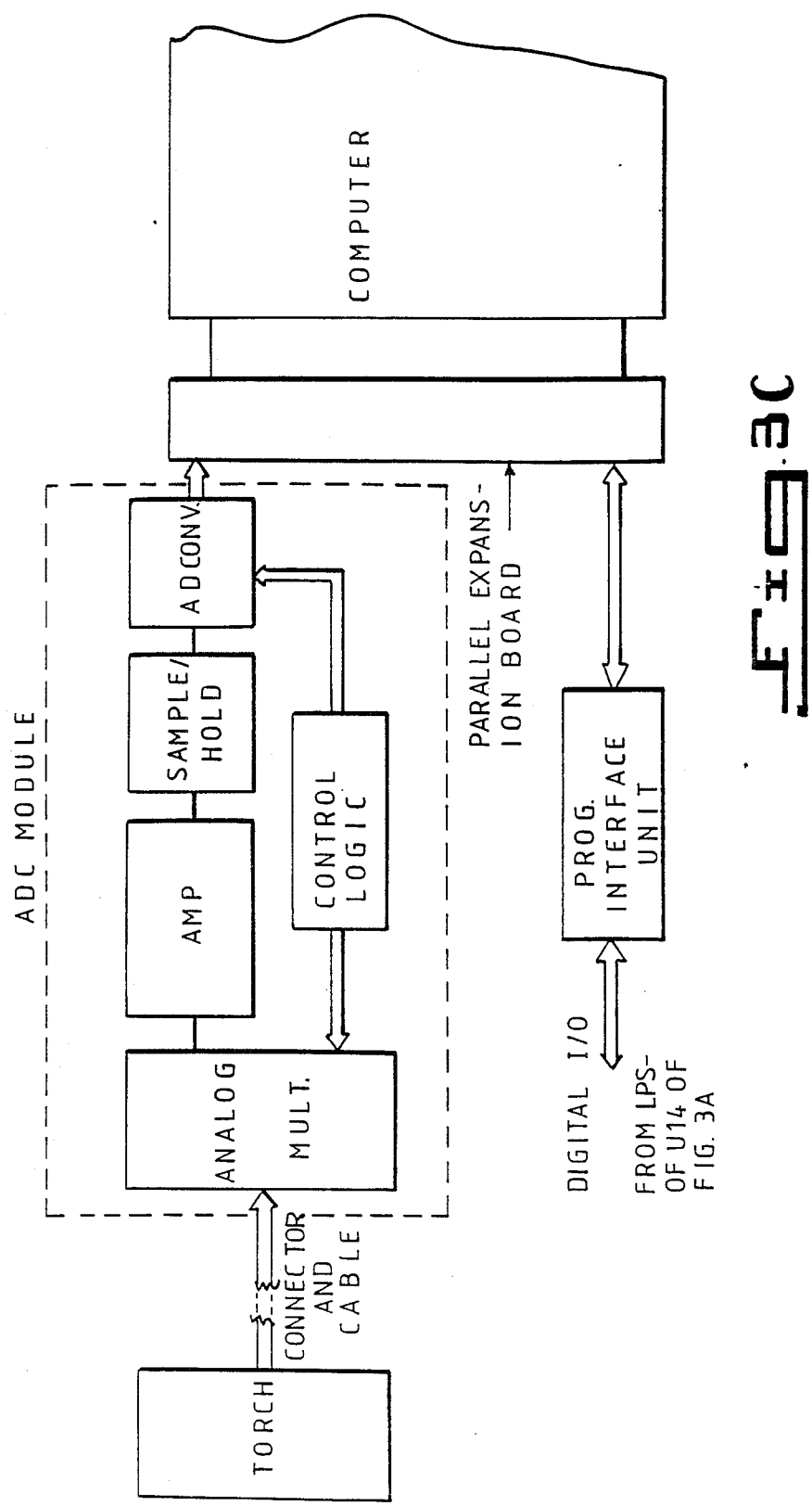

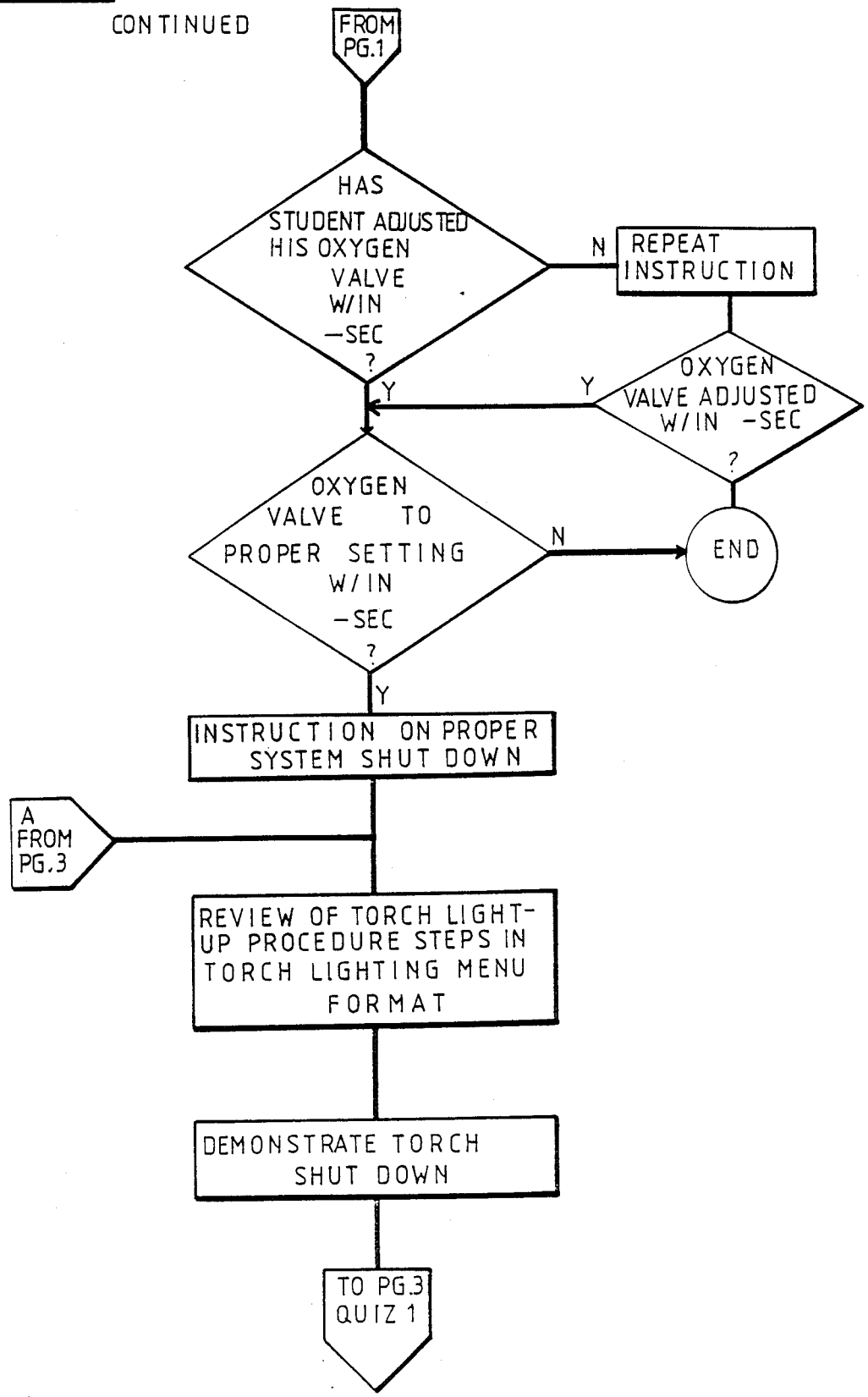

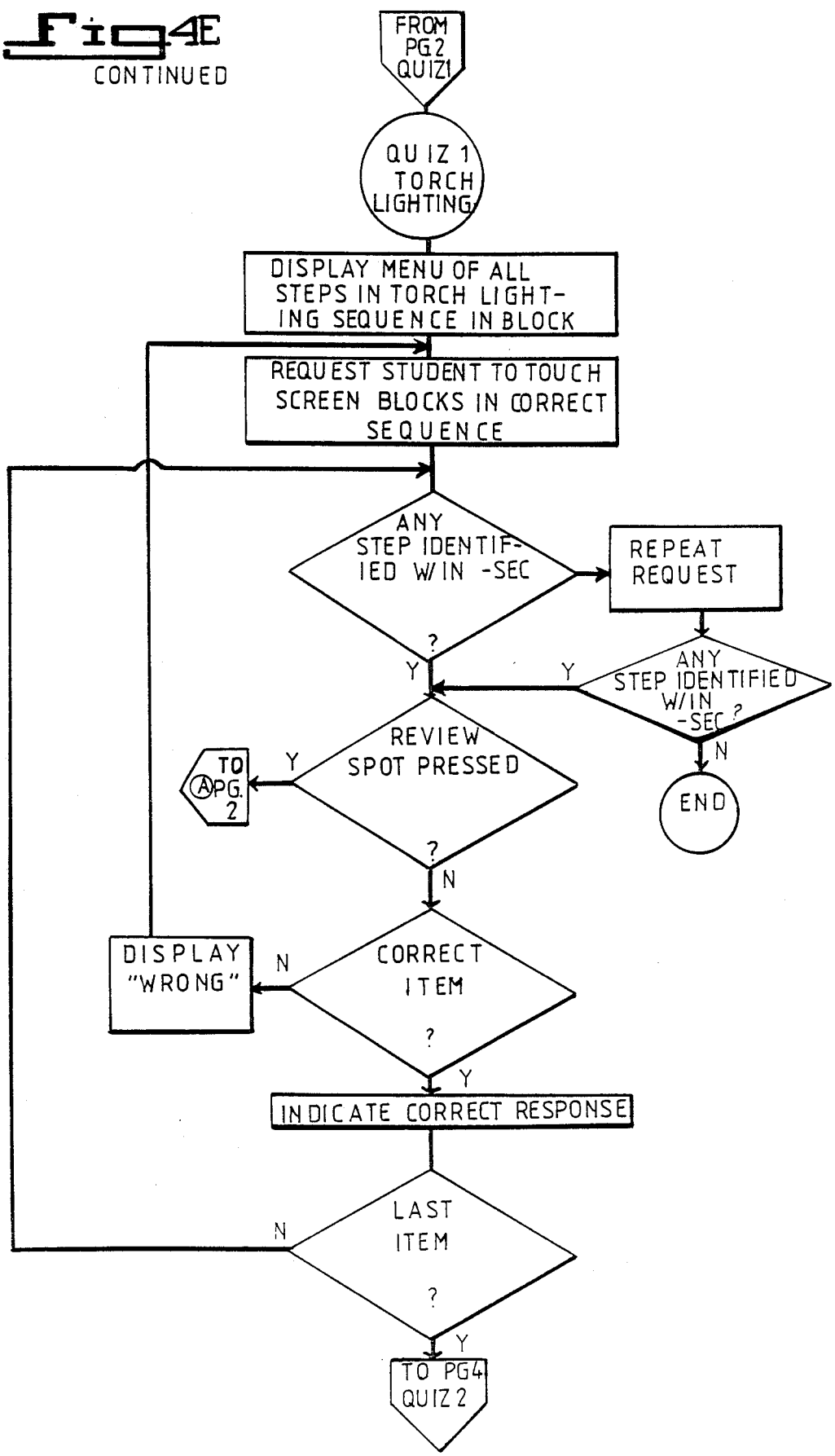

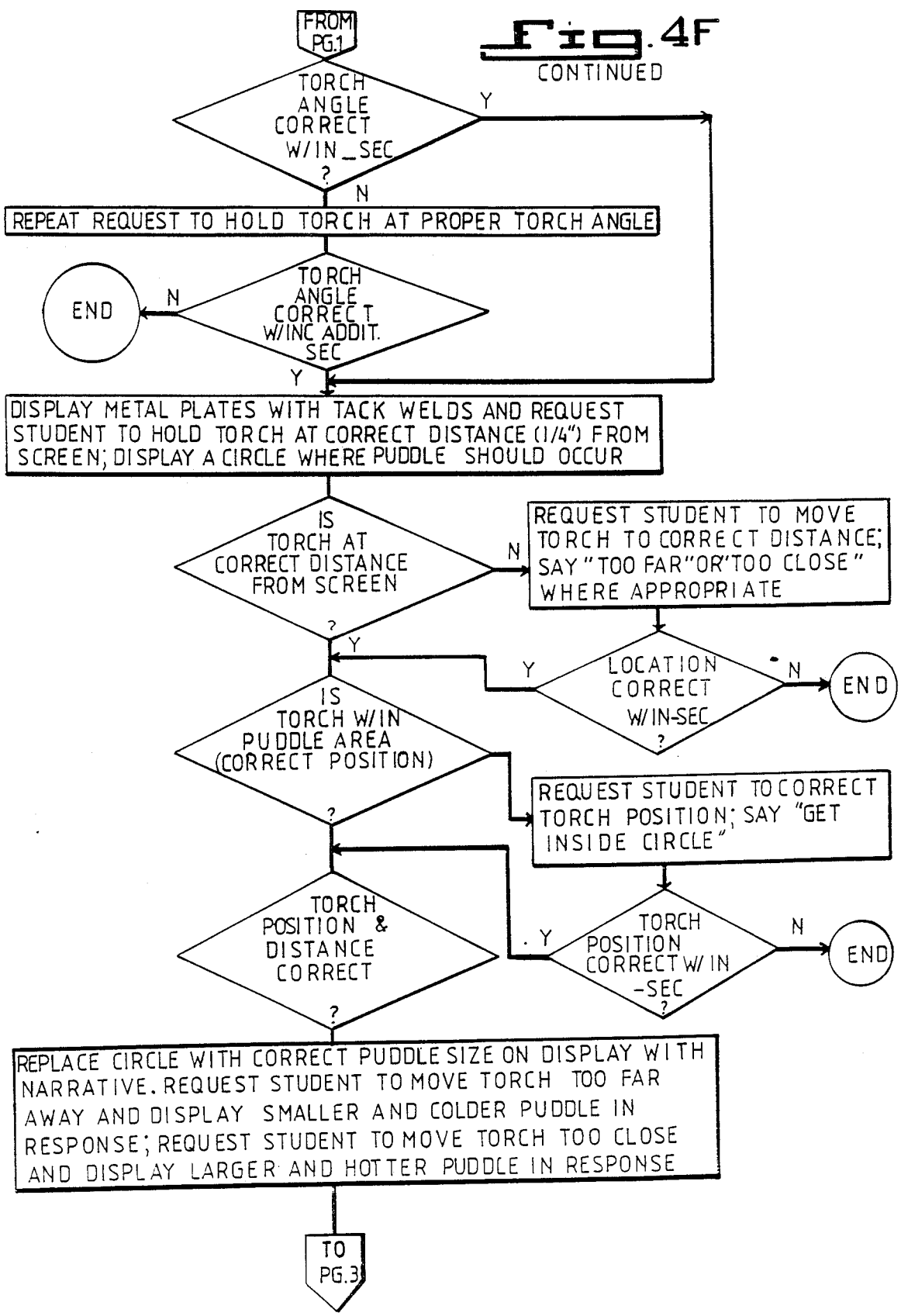

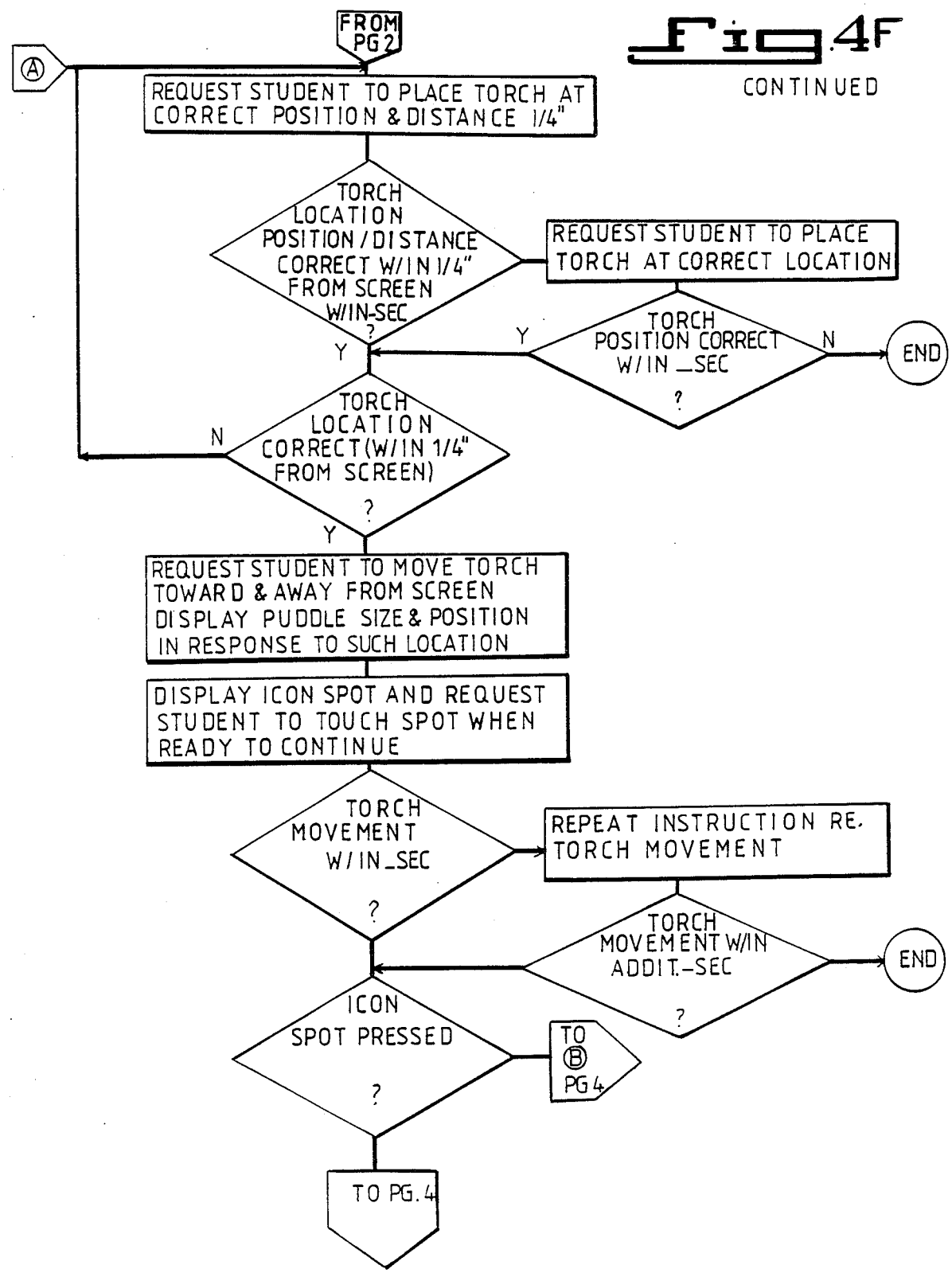

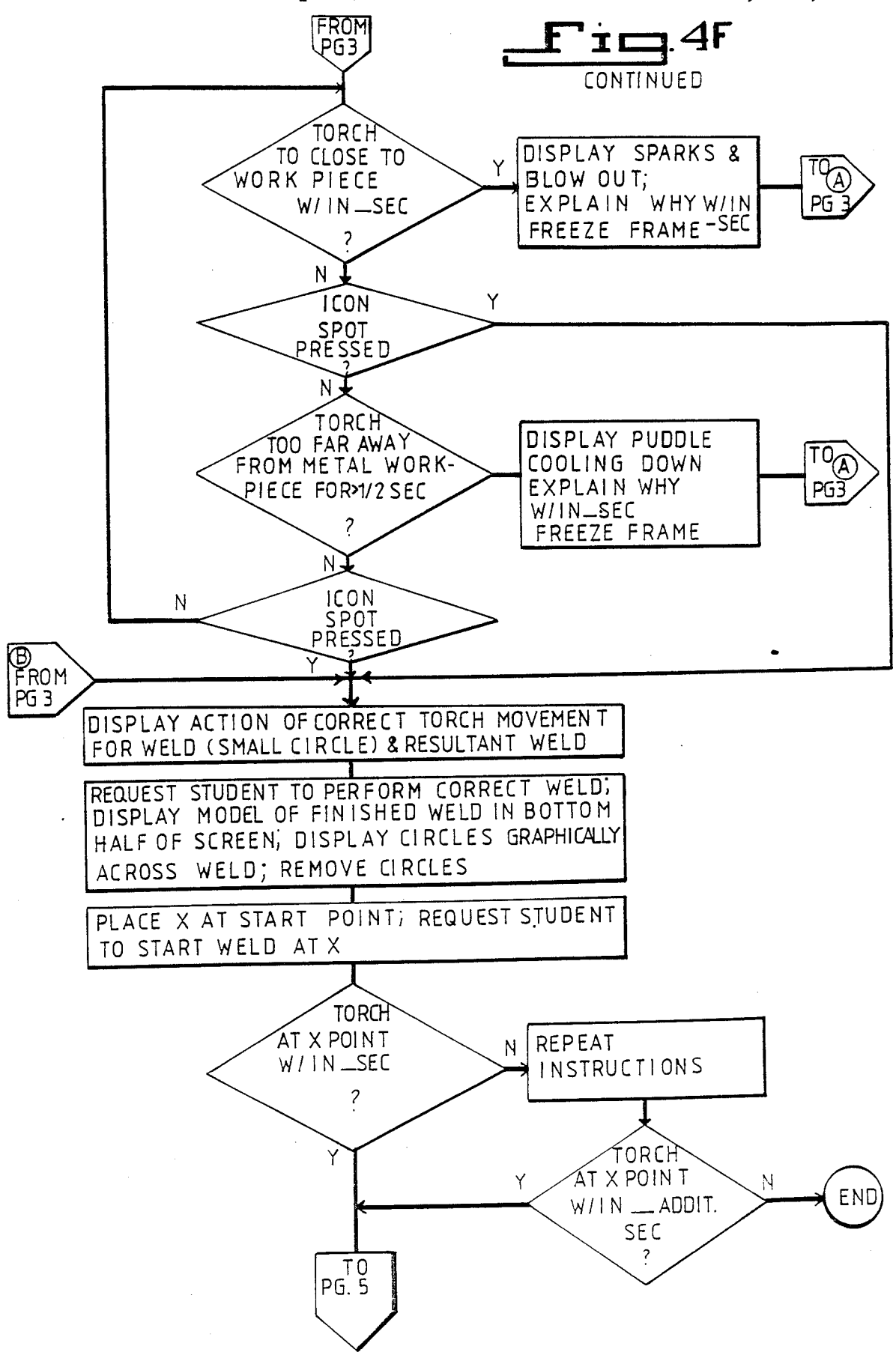

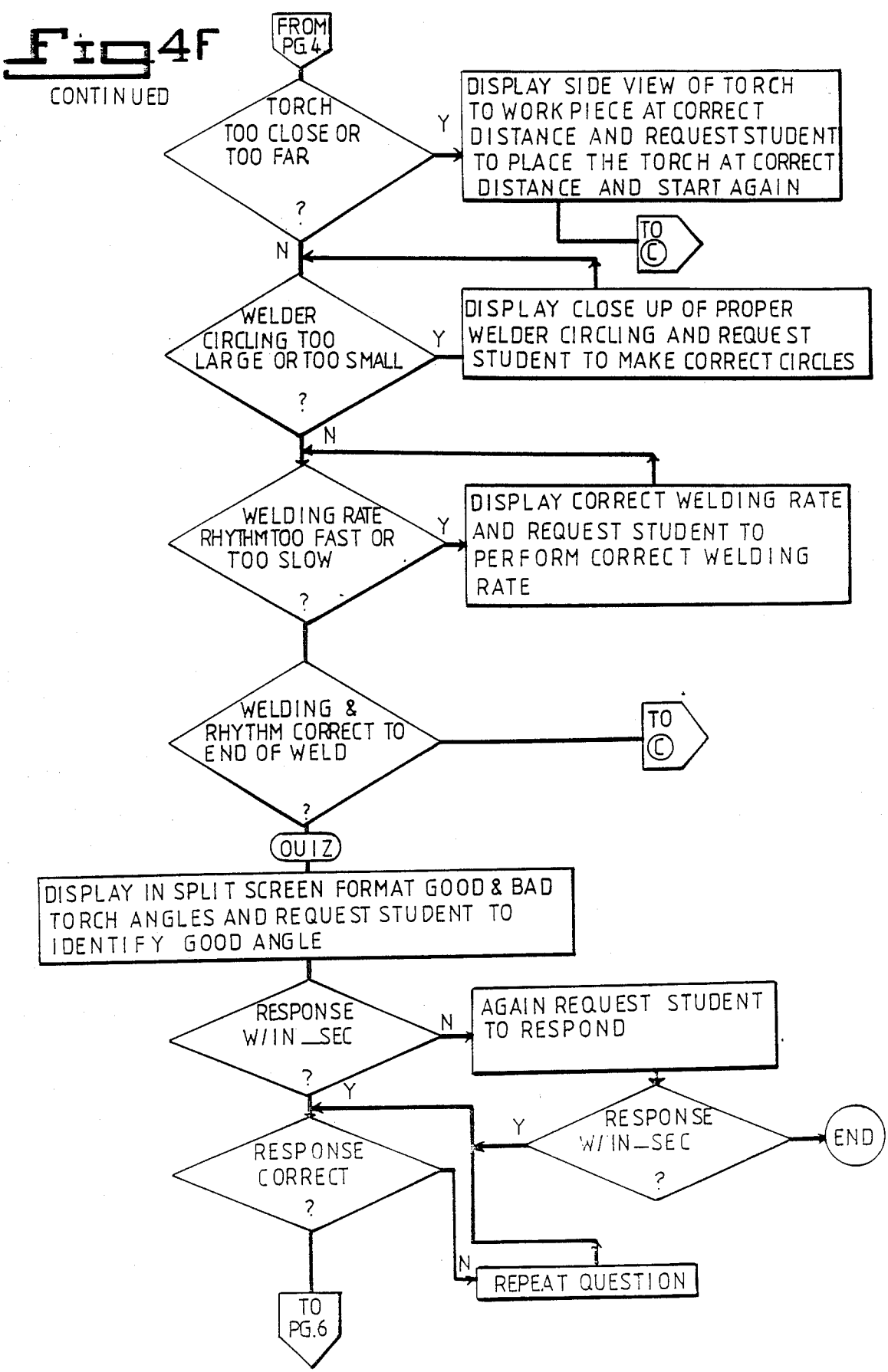

Fig. 4F CONTINUED

```
FROM PG.5
   │
   ▼
┌─────────────────────────────────────────────┐
│ DISPLAY IN SPLIT SCREEN FORMAT GOOD AND BAD │
│ TORCH POSITION AND REQUEST STUDENT TO       │
│ IDENTIFY GOOD POSITION BY TOUCHING SCREEN   │
└─────────────────────────────────────────────┘
   │
   ▼
  ◇ RESPONSE CORRECT ?
   │ Y
   ▼
┌─────────────────────────────────────────────┐
│ DISPLAY TORCH TOO CLOSE AND TOO FAR IN      │
│ SPLIT SCREEN FORMAT                         │
├─────────────────────────────────────────────┤
│ REQUEST STUDENT TO IDENTIFY WHERE TORCH     │
│ WOULD BE FOR COLD & SMALL PUDDLE BY         │
│ TOUCHING SCREEN                             │
└─────────────────────────────────────────────┘
   │
   ▼
  ◇ RESPONSE CORRECT ? ──N──▶ [REPEAT QUESTION]
   │ Y
   ▼
┌─────────────────────────────────────────────┐
│ REQUEST STUDENT TO IDENTIFY WHERE TORCH     │
│ WOULD BE FOR HOT & LARGE PUDDLE BY          │
│ TOUCHING SCREEN                             │
└─────────────────────────────────────────────┘
   │
   ▼
  ◇ RESPONSE CORRECT ? ──N──▶ [REPEAT QUESTION]
   │ Y
   ▼
┌─────────────────────────────────────────────┐
│ DISPLAY IN SPLIT SCREEN FORMAT WELDS WITH   │
│ GOOD AND BAD PENETRATION AND REQUEST        │
│ STUDENT TO IDENTIFY WHERE TORCH WOULD BE    │
│ FOR GOOD PENETRATION BY TOUCHING SCREEN     │
└─────────────────────────────────────────────┘
   │
   ▼
  ◇ RESPONSE CORRECT ? ──N──▶ [REPEAT QUESTION]
   │
   ▼
  (END)
```

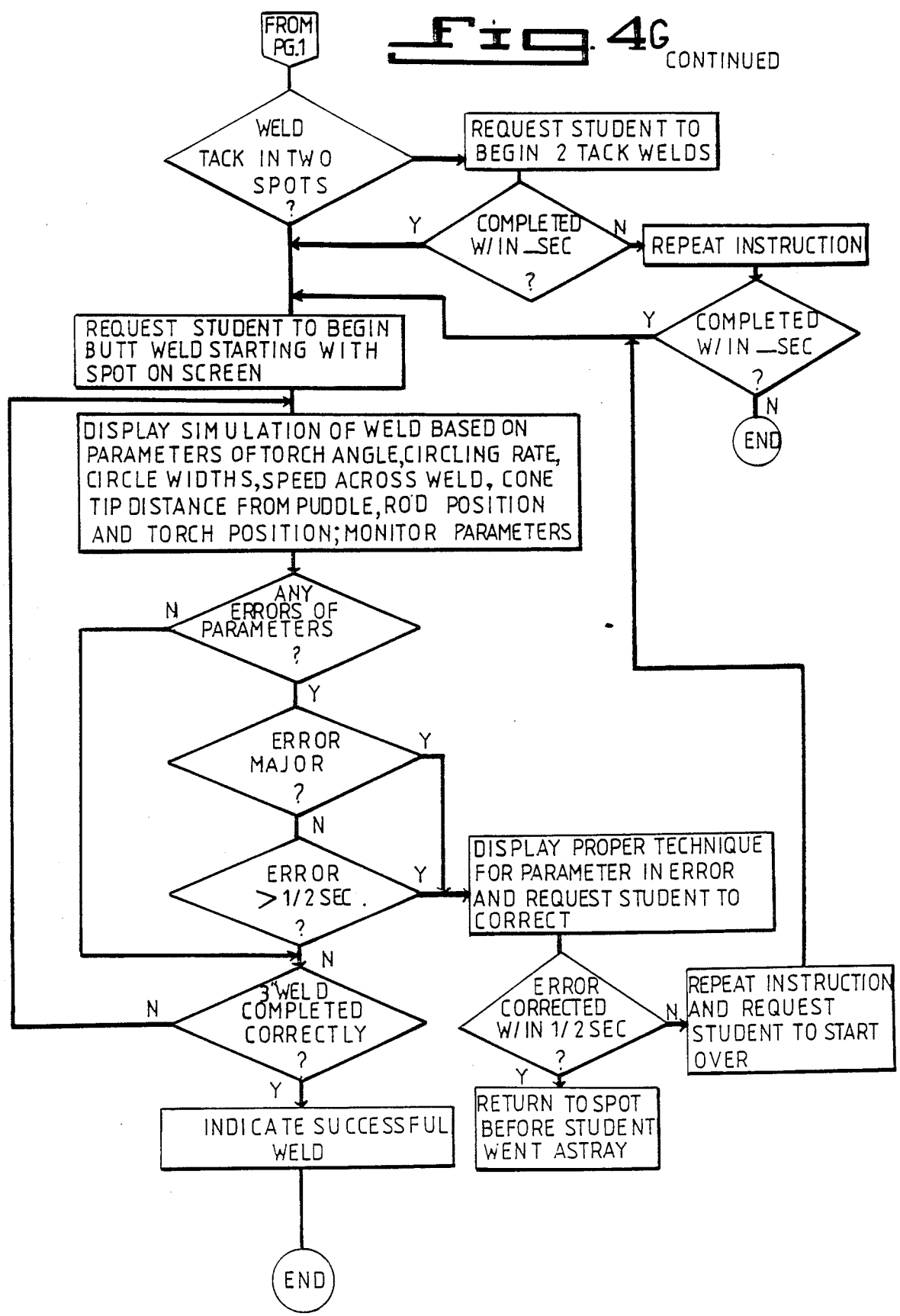

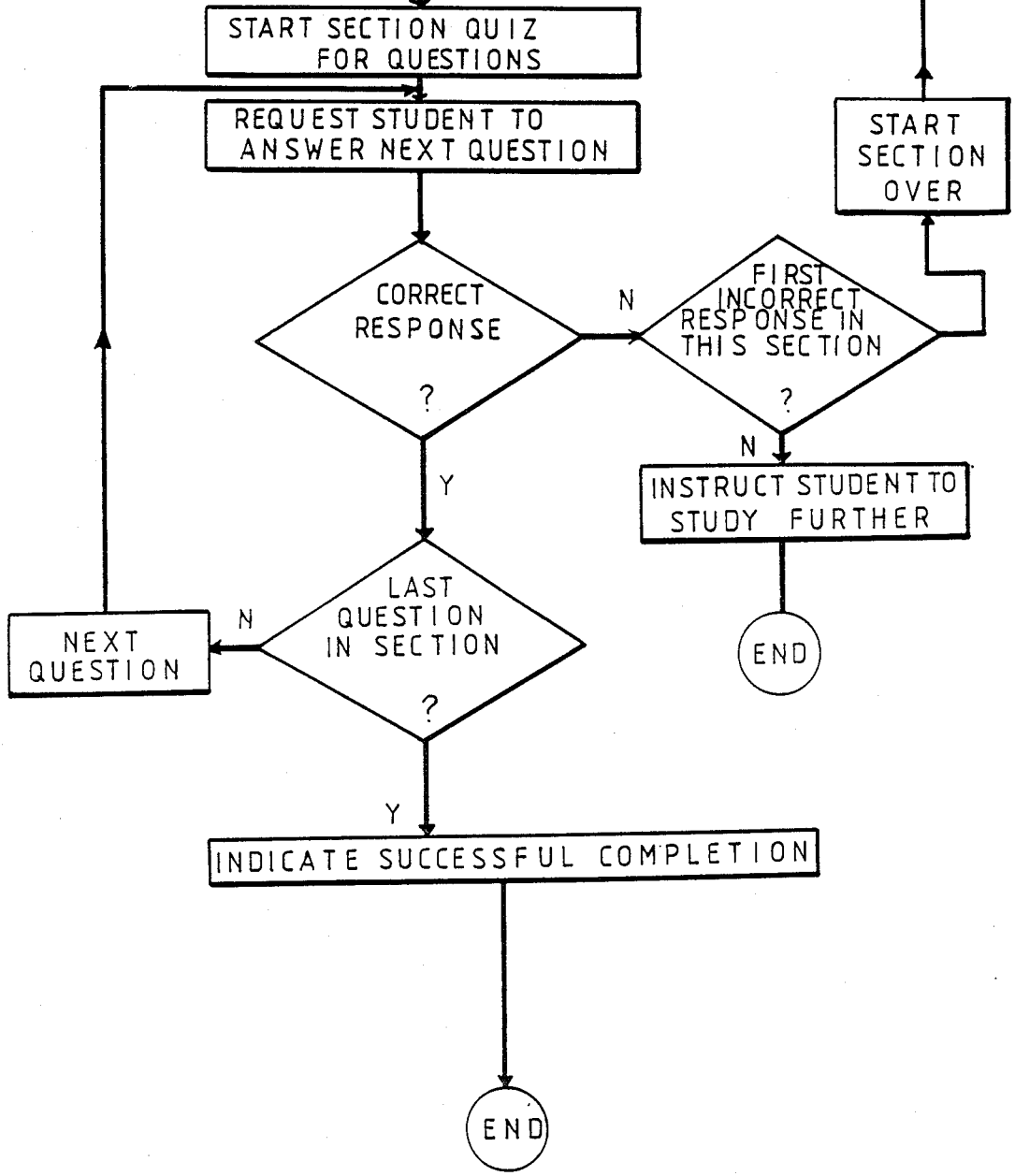

AUDIO VISUAL INSTRUCTIONAL SYSTEM

This application includes a microfiche appendix including three fiches of 198 pages.

BACKGROUND OF THE INVENTION

The present invention relates to audio visual instructional systems and more particularly to a welding instructional system for instructing students how to weld using a welding torch simulator interacting with a visual display of a welding site.

In various types of student learning situations, especially those involving hands-on situations wherein a student must manipulate a tool to learn a new skill, an instructor need be present to see the student perform the skill and to critique the performance. This is especially true in cases where the skill involves a safety hazard, such as a welding torch or the like which uses an oxygen-acetylene flame. The student must not only learn under potentially dangerous conditions, but the instructor must be present, thereby increasing the cost of instruction and preventing the instructor from performing other tasks. Moreover, the presence of the instructor during the initial learning phases may cause anxiety in some students especially where the instructor expects the student to learn the skill within a certain time period. Further, in such situations, the student must schedule a learning session at a time when the instructor is available, which may not be the most convenient time for the student.

SUMMARY OF THE INVENTION

According to the present invention a tool-workpiece instructional system is provided for simulating operations of a tool on a workpiece. The system comprises a tool, display means for displaying images of a workpiece and location detection means responsive to the display means and the relative location of the tool and display means for producing a location signal indicative of the relative location. Addressable memory means are provided for storing information for generating, on said display means, different images of sequential stages of the workpiece undergoing operation thereon by said tool in dependence on said location signal. A control means is provided, responsive to said location signal and the image currently displayed, for addressing said memory means to address the information used to generate images on said display means representative of changes in said workpiece by said tool operation thereon.

In one particular embodiment, the tool is a welding torch and the workpiece displayed is a welding site. The tool-workpiece relative location is preferably (1) distance of the tool to the workpiece displayed and (2) the position of the tool projected onto the plane containing the display means. The control means preferably comprises a computer with a control program and the display means is preferably horizontally located.

This, in accordance with the present invention, an audio visual instructional system is provided for teaching students tactile skills with techniques including realistic simulation of a workpiece undergoing work by a student using a tool, which may be of a simulative design. In particular, a welding instructional system is provided for teaching welding to a student using a simulative welding torch which senses a number of parameters and displays the effect of the welding torch on a workpiece on a display in dependence upon such sensed parameters. The instructional system may include a number of learning phases including demonstration by a role model, quizzing by a student of basic skills in a question and answer type format, performance by the student of various separate skills associated with the overall welding process, and performance by the student of a complete weld, using the simulative torch and display, from setup to setdown, including monitoring various parameters of location and angle of the torch relative to a workpiece on a display.

The particular welding course with which the present invention is used includes (1) a thorough orientation to the welding oxy-acetylene equipment and its safe setup and handling, (2) a perceptual and tactile ability to adjust the oxy-acetylene flame for the particular given welding task, (3) the ability to distinguish precisely, and at an early enough stage in the learning process, and at an early enough juncture to correct, the status of the "bead" and the metal workpiece being worked on, and (4) the ability to simulate the running of the bead in real time and with realistic responses to changes in speed, direction, angle, temperature and path of the simulative torch in relation to the display. These factors allow the student to preexperience innumerable successful and unsuccessful welds, not just by watching an instructor, but by performing the weld on a display. The student can experience a welding situation in a safe and unpressured environment, and repeat performances until they are mastered, so that the student will have acquired basic welding skills before real equipment is used, and without requiring the presence of an instructor. In this way, the student may be more experienced using simulative equipment having seen the results of good and bad techniques such as flashbacks as a result of holding the torch too close to the workpiece, and can have more successful experiences based on correct procedures and learned perceptions.

In the first, orientation stage of the learning process, the student benefits both from the realism and time compression of having visualized equipment, live demonstrations, and animated conceptual graphics (for example, explaining the balance of the pressures of oxygen and acetylene inside a welding torch as indicated by outside gauges). There will be a conceptual simulation of the correct steps in setup of the welding equipment and adjustment of the welding torch, with the system testing and offering feedback to the student at all times. In this phase, the student is to setup the equipment, through a pattern of choices on the screen, and will be coached whenever a decision on any step, or within a variance or value within a step, was entered wrongly. In the most crucial instances, a problem can be simulated onscreen which the student must correct. At the completion of this phase, the student should be thoroughly familiar with the safe setup in the initial operation of the basic oxygen acetylene torch, including torch lighting.

In the second stage, the student will learn through perception and tactile ability, adjustment of the oxygen and acetylene flame for the particular welding task at hand. The display will give a realistic representation of an oxyacetylene flame which will be manipulated on a random access video disc to provide instantaneous simulation of the intensities and minute variations in the "feather" and "cone" in a manner that represents the flame in a safe environment, since heat and potential danger are not present. With special filtering techniques, the picture seen on a video screen will be what is seen through welding goggles. Furthermore, the computer will track precisely, to about 1/30 of a second, what image is on the video screen and what pattern actions the student is taking in response to what the student sees. This arrangement will allow the student not only to practice various mixtures and intensities of flame in a totally safe environment, but then to be requested by the system to demonstrate several manipulations of that flame. All of these student responses can be evaluated to relatively minute detail, and coaching will occur at the earliest stage of confusion or wrong action. The completion of this simulation state will provide the student with knowledge and comfort in all of the various flame adjustments he or she may have to use in numerous types of welds. A system evaluation or quiz is available to tell the student and the instructor that the student is ready, having mastered the skills in this section.

In the third learning phase, the student will be able to master the ability to distinguish precisely, and at an early enough juncture to correct, the status of the bead and the metal workpiece being worked on. This ability presents the last cognative bridge between knowing and doing a good weld. In the stimulation, the student would first be coached to the correct flame for the butt weld on a flat sheetmetal workpiece, and then be asked to indicate how he would place the metal, what rod would be selected, how the rod would be held, and how close and at what angle the torch would be held to the weld. When the student has indicated mastery of all of the proper factors to the satisfaction of the system, he will then be asked to move the bead along with the torch. Once again, simulation provides the student with realistic feeling of making the weld, and the system, and the system will know to the nearest 1/30 of a second where the student has placed the torch and a welding rod, and can thus change the picture accordingly or decide that the student has deviated too much from proper welding action and coach him to return to proper performance. The student will then be able to attempt the simulated butt weld as many times as necessary or desire to achieve the correct actions.

In the fourth learning phase, the student will have the ability to simulate an entire welding operation, including running of the bead in real time and with realistic responses to changes in speed, angle, temperature and path of the torch. Beyond the core simulation of unit setup, flame adjustment, and a successful preliminary butt welding experience, the simulation heightens realism through mechanical systems working conjointly with a computer/video simulation. The flame adjustments, angle of the torch, and even the torch's proximity to the weld are ascertained by sensors built into a simulative torch. Welding rod placement relative to the welding site display is also sensed. The mechanical simulation element in the form of a welding torch will provide analog oxygen and acetylene adjustment valves, with positional and distance sensors which will simulate the motion of puddle formation, rod control and bead movement, all following acceptable welding techniques.

Other advantages and objects of the present invention will become apparent from a consideration of the following detailed description, attached claims and accompanying drawings.

BRIEF DESCRIPTION OF THE DRAWINGS

FIG. 2C is a top view, in partial cross section, of the adjustment knob for the oxygen valve for the welding torch simulator according to the invention;

FIG. 2D is a rear view, in partial cross section, of the welding torch simulator according to the invention;

FIG. 3A is an electrical schematic of an interface card for connection to the welding torch simulator and the computer for generating signals representing torch position projected on the monitor screen;

FIG. 3C is an electrical schematic of an ADC card for converting analog signals representing oxygen and acetylene valve positions, and torch-to-display distance information to the computer;

DESCRIPTION OF THE PREFERRED EMBODIMENT

The present invention relates to teaching manipulative skills using a tool held by a student and manipulated relative to a workpiece image displayed on a screen to simulate work by the student on the workpiece. A particular embodiment of the invention will be described wherein the workpiece is a welding site, i.e. two pieces of metal to be joined together by welding, and the tool is a welding torch simulator which is similar to a welding torch in outward appearance and controls, but which does not emit a flame because no oxygen or acetylene is suppled to the torch. Further details will be explained below.

Figure 1:
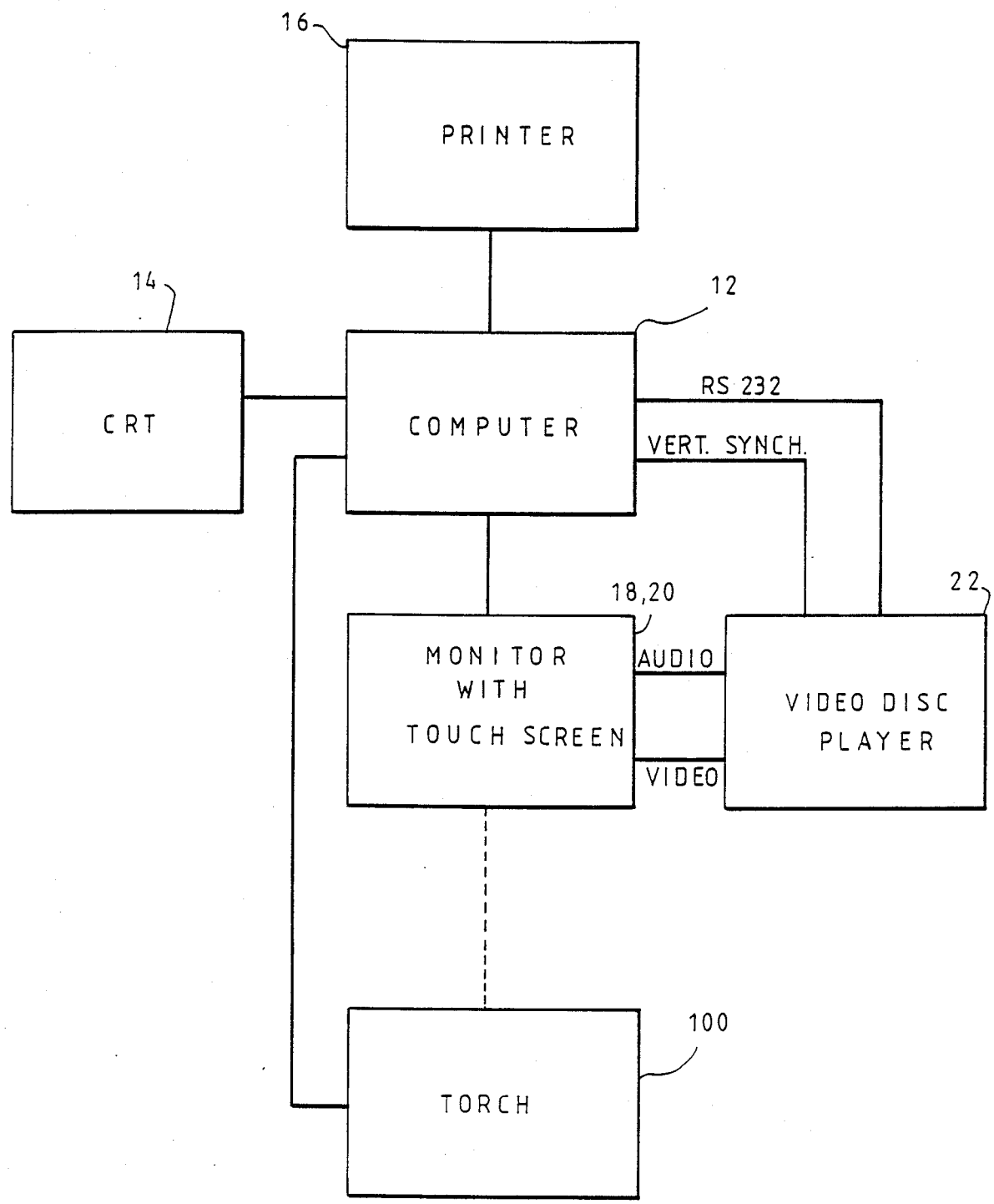
FIG. 1 is a block diagram of the instrument simulator system according to the invention.

Referring to FIG. 1, a particular embodiment of a welding instructional system 10 is shown comprising a computer 12, CRT 14, printer 16, monitor display 18 with touch screen 20, video disc player 22 and torch 100.

The computer 12 is preferably an IBM model PC-AT or other IBM compatible computer having 256K bytes of RAM memory and at least a single diskette drive. This computer model has a number of ports to which the other components are connected. The printer 16 (which may be any commercially available compatible printer) and monitor 18 (which may be a Zenith ZVM 131 or 135) are connected to port 2, which is an RS-232 port. The computer's CRT 14 is connected in a conventional manner according to the manufacturer's instructions. The touch screen 20, which is installed on the surface of monitor 18, is connected to port 7, which is also an RS-232 port and is available from Microtouch.

An interface card between the torch 100 and the computer, which will be described in more detail in conjunction with FIG. 3, may be connected to any port of the computer. The video disc player, which may be a Philips video disc, is connected to port 4 which is an RS232 port and is also connected to port 1 at the vertical synch terminal, as shown in FIG. 3.

The torch 100 is equipped with a light pen and fiber optic cable terminating at its tip, and provides means for sensing light from the monitor and to provide signals from which the position of the torch tip in a plane defined by X-Y coordinates can be detected, said plane being parallel with the plane containing the monitor. The distance of the torch tip from the monitor, along an axis orthogonal to the plane of the monitor, can also be determined.

As used herein, the term "location" refers to the relative "position" and/or "distance" of the torch from the display. The term "position" is intended to refer to where the torch tip would project on the X-Y coordinate system of the display, and "distance" is to refer to measurement of the torch tip from the display taken orthogonal to the display, and may also be referred to as the Z coordinate orthogonal to and originating at the X-Y plane of the display. This distance value is also height of the torch tip from the display in a vertical direction, when the display is oriented horizontally, which it is during normal operation.

The light pen and filer optic cable (whose end is at the torch tip) will provide an analog voltage signal whose amplitude is proportional to the distance between the torch tip and the monitor. This voltage signal is provided to the interface card where it is converted by ADC circuitry into a digital signal for use by the computer. Also provided to the computer by the torch 100 is information relating to the torch angle relative to the monitor screen. Specifically, 20° and 60° mercury switches are mounted in the torch 100 and provide information on whether the torch angle is correctly oriented relative to the monitor. The torch also includes simulative oxygen and acetylene valves which include potentiometers connected to a voltage source, and provide voltage signals whose magnitude is proportional to the position of the oxygen and acetylene valves. The computer used torch position information (providing an indication of the position of torch on X-Y axes in a plane paralled with the plane of the monitor) and torch distance information (providing an indication of torch distance from the display orthogonal to the display along a Z axis) along with torch angle, and acetylene and oxygen valve information to determine what resultant effect a torch flame would produce on the workpiece, if the torch was a real torch, and causes the video disc player to display such result on the monitor in real time, to thereby provide instant feedback to a student. By moving the torch relative to the screen using proper welding techniques, a welding operation can be simulated all in a safe manner, because no flame is used and no gas is used, and burns are avoided because the workpiece does not become heated. Because the simulation is entirely safe it may be performed by inexperienced students at their own learning pace and without the supervision and time investment of a skilled teacher.

Figure 2A:
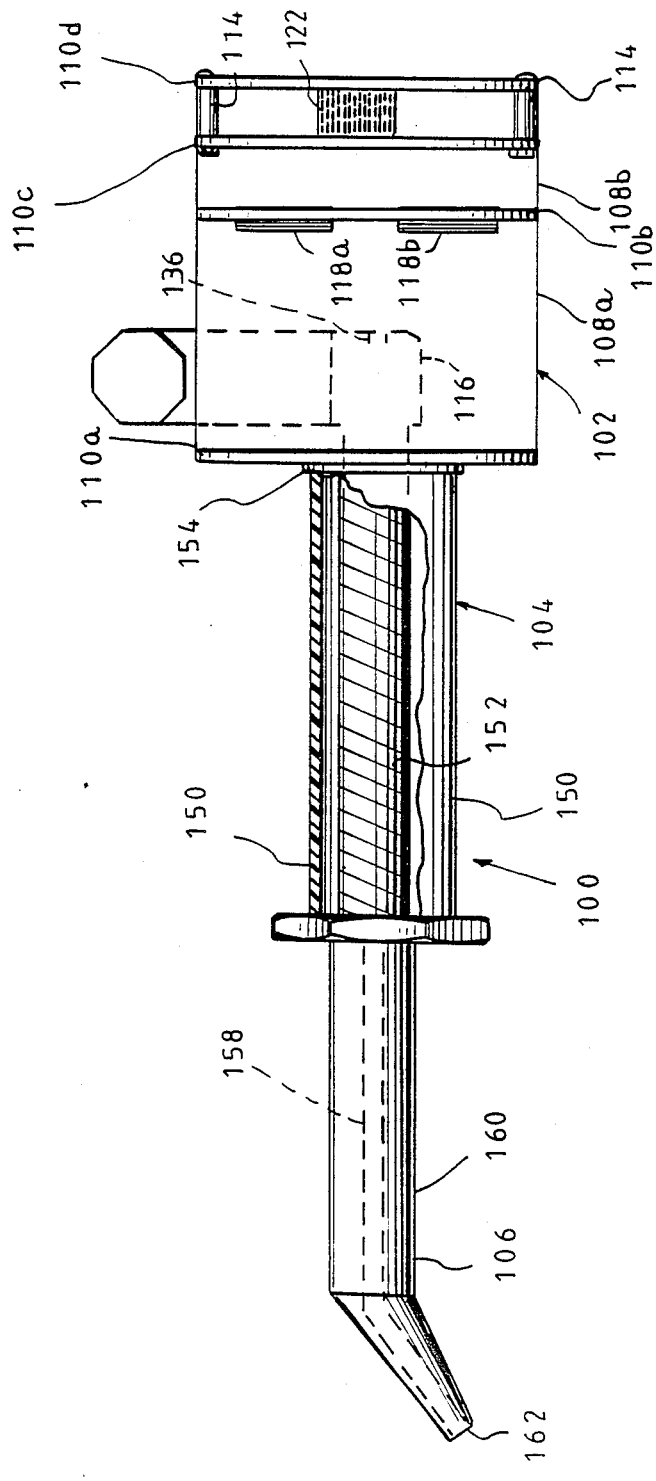
FIG. 2A is a side elevational view, in partial cross section, of a welding torch simulator according to the invention.
Figure 2B:
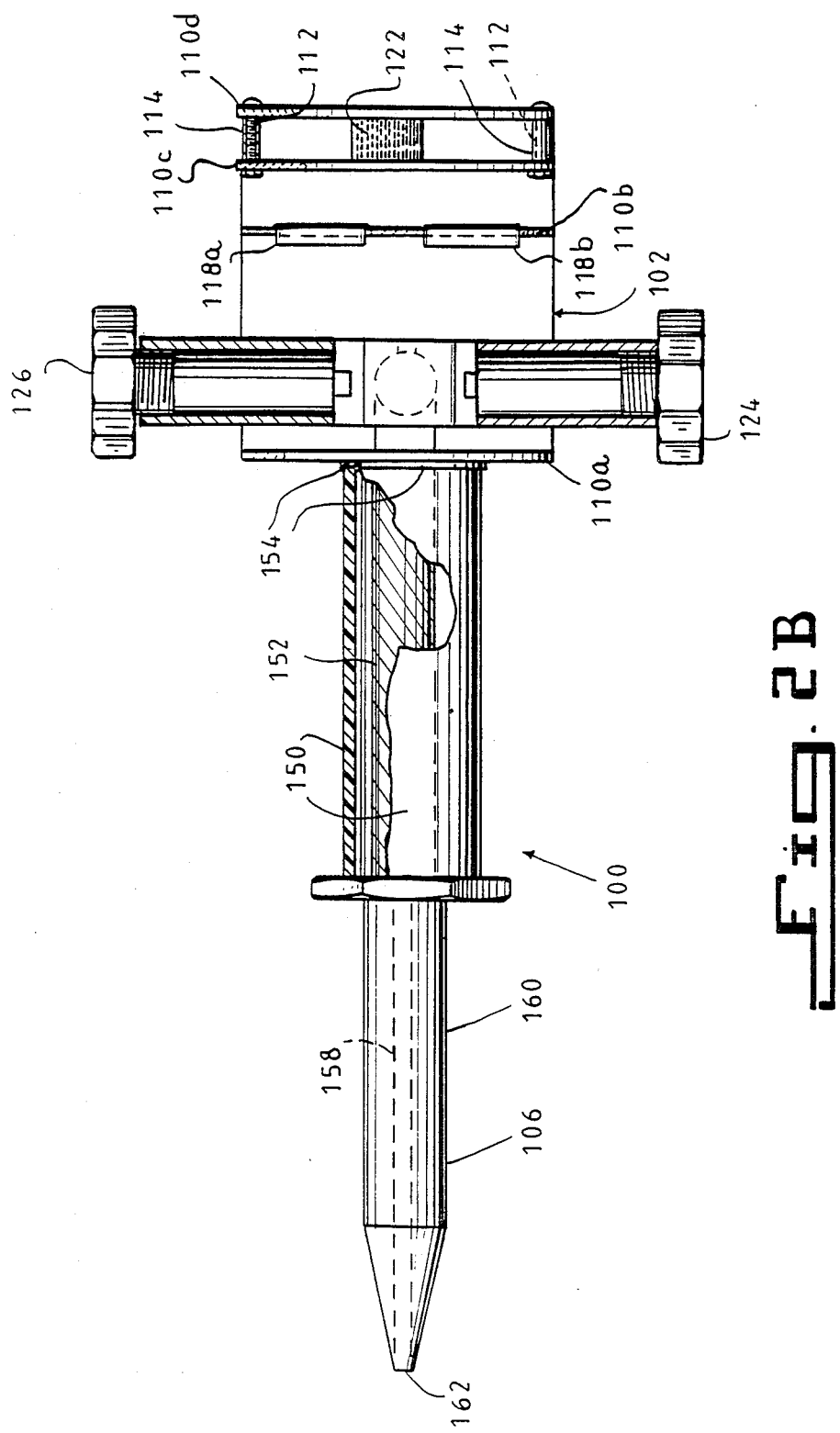
FIG. 2B is a top view, in partial cross section, of the welding torch simulator according to the invention.

Turning now to FIGS. 2A–2E the welding torch simulator ("torch") will now be described. FIG. 2A shows the torch 100 in elevational side view, in partial cross-section. The torch 100 comprises a base portion 102, a central portion 104 and a tip portion 106.

The base portion 102 comprises an outer CPVC tube 108 having sections 108a and 108b and plexiglass discs 110a, 110b, 110c and 110d. Disc 110d is secured to disc 110c by three machine screens 112 (see FIG. 2D) and three associated spacers 114 (two of which are shown in FIG. 2A) arranged about equidistantly around the edge of the disc 110d as shown in FIG. 2D. The other discs 110a, 110b and 110c and tube sections 108a and 108b are secured to each other by suitable cement.

The tube section 108a houses a CPVC 90° elbow 116 which is connected to a CPVC Tee 118, with the top of the Tee extending outside of the tube section 108a through an appropriate hole. The tube section also houses mercury switches 120a and 120b, which are mounted on plexiglass disc 110b. These switches sense angular position of the torch relative to the monitor display, with the display being in a horizontal plane. If we define the horizontal plane as containing an X and Y coordinate system with the Z axis orthogonal to and extending out of the display plane, then switch 120a will close when the torch axis is 20° (plus or minus about 5°) from the Y-Z plane (toward the right), and switch 120b closes when the torch axis is 60° (plus or minus about 5°) from the X-Y plane (toward the user) to define an optimum welding torch angle for a particular welding tip and welding application. Of course, these angles can be changed, or the range of each switch extended or diminished, by changing the switch, reorienting the switch, or adjusting the switch on some models of switches.

Figure 2E:
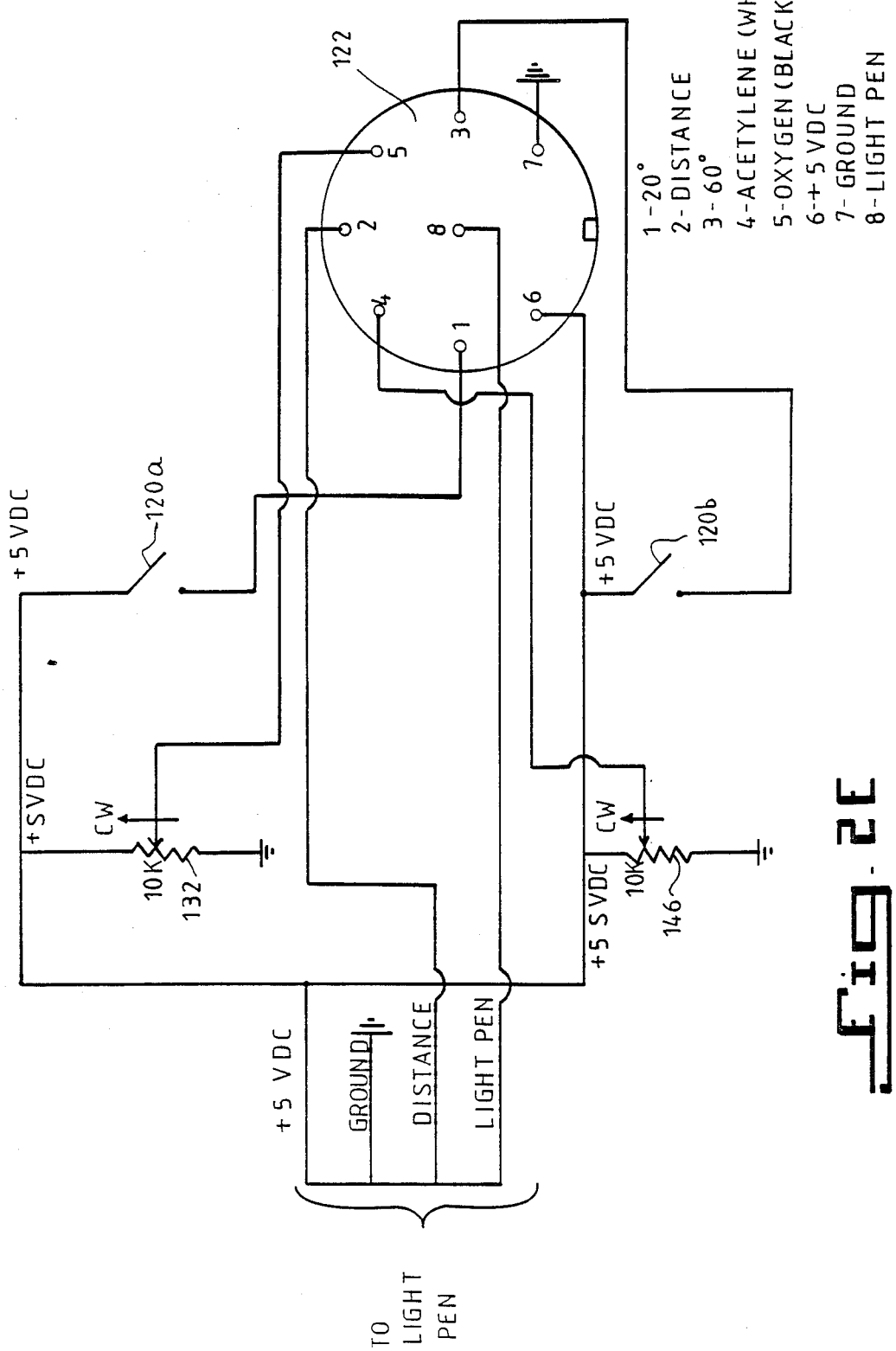
FIG. 2E is an electrical schematic of the electrical components of the welding torch simulator according to the invention.

These angle switches are connected to the computer to provide information on torch angular position, and are connected electrically by wires through a hole in disc 110b and a hole in disc 110c to an 8-pin connector plug 122 as shown in FIG. 2E, and further to the computer as will be explained below.

As shown in FIG. 2D, the top of the CPVC Tee 118 houses an acetylene valve control knob 124 and an oxygen valve control knob 126 each of which are machined AN8 bolts. As shown in FIG. 2C, the bolt 128a for the acetylene control valve 124 is connected to one end of a shaft 130 which is attached at its other end to a rotary 10k ohm trimmer potentiometer 132 by way of tab 134 so that rotation of the bolt effects adjustment of the trimmer 132. To hold shaft 130 in longitudinal position an outside threaded copper plumbing tube 136 is provided having a threaded opening 138 for receiving a set screw 140. The shaft 130 has a machined groove 142 for receiving the set screw 140. Threaded to the outside of the plumbing tube 136 is an inside threaded copper plumbing fitting 144, (also having a hole for receiving the set screw 140) and the inside of the CPVC Tee 118. The completed assembly is shown in FIG. 2D. The terminals of the trimmer 132 are connected to the 8-pin connector plug 112 as shown in FIG. 2E. The oxygen control knob is constructed in the same manner and connected electrically as shown in FIG. 2E. When the trimmer pots 132 and 146 are turned all the way off (fully clockwise) the resistance between the 5V pin and the wiper should be zero ohms, and the resistance between the wiper and ground should be 10 Kohms.

Referring again to FIGS. 2A and 2B the central portion 104 of the torch 100 comprises an outer CPVC tube 150 which houses a light pen 152 and is joined to the base portion 102 by the CPVC elbow 116. A rubber grommet 154 is interposed between the base portion 102 and the central portion 104. The light pen may be a model VPT/HPV available from Light Pen Company of Los Angeles, Calif. and is electrically connected to the 8-pin plug 122 by wires as shown in FIG. 2E. The wires pass through the CPVC elbow 116 and out of a hole 156 formed in the elbow, and then through openings (not shown) in plexiglass discs 110b and 110c. Extending from one end of the light pen is a fiber optic cable 158, which cable lies in a hollow central portion of welding tip 160 in tip portion 106 of the torch. The cable 158 terminates at a torch tip orifice 162. As shown in FIG. 2A, the welding tip 160 has a bend of about 45° near its front end, similar to the configuration of one kind of welding tip of a conventional welding torch. The welding tip 160 is connected to the central portion 104 by means of a nut 164 which is threaded into a threaded end of central portion 104.

Referring to FIG. 3A, the interface card is connected to the light pen of the welding torch and provides a signal indicating the period of time between when a raster scan display of the screen monitor commences and the time that the light pen senses light, which of course will depend on where the light pen is located on (or will project onto) the display. This time signal will be provided to the computer in digital form, and will be used by the computer to determine precisely the X-Y coordinate of the light pen in a plane which is parallel to the plane of the display.

Figure 3B:
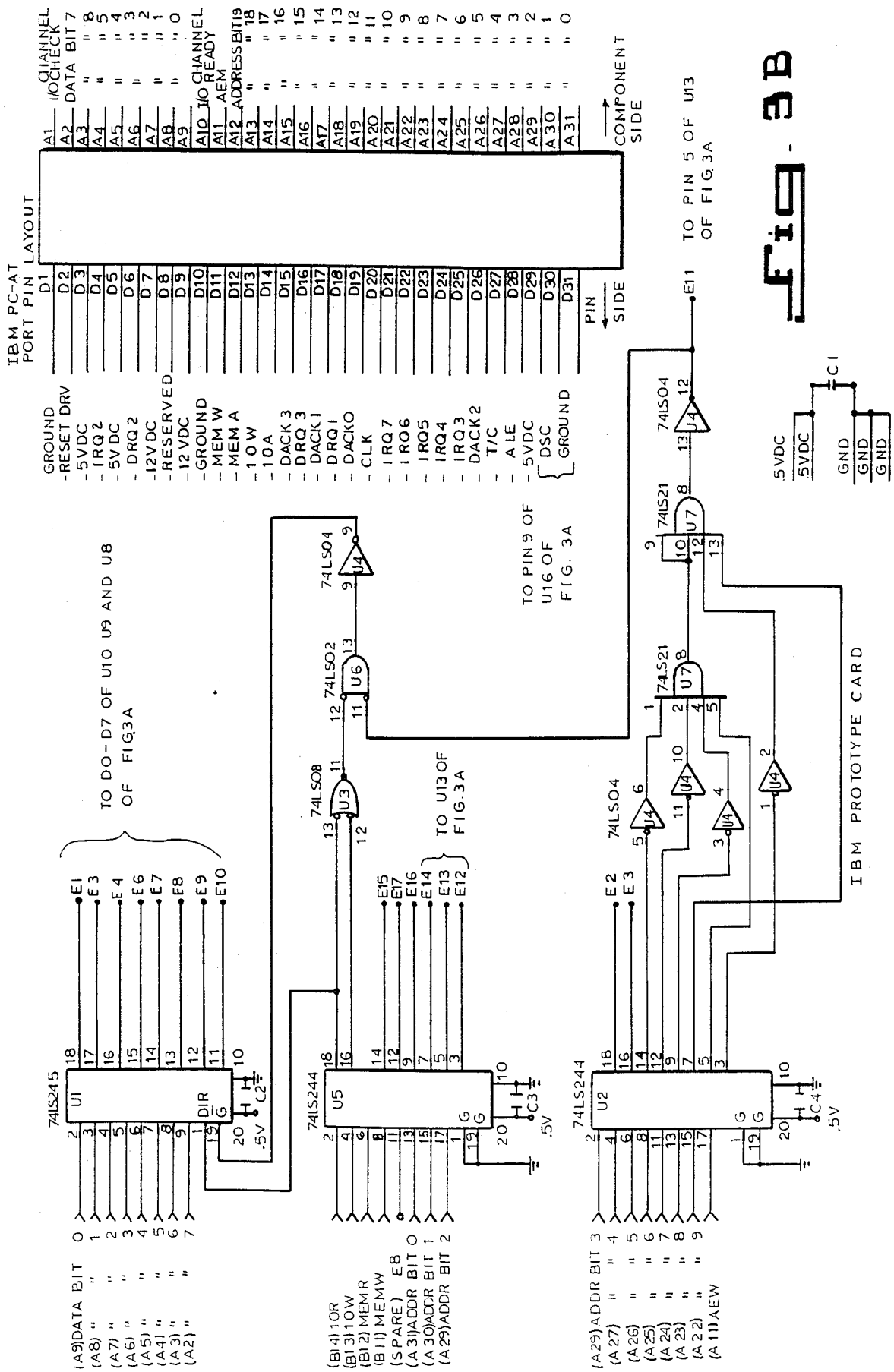
FIG. 3B is an electrical schematic and pin layout of an IBM prototype card which is used for connecting the interface card to the computer and to indicate the pin layout of the IBM computer model used.

As shown in FIG. 3A, the interface card receives a VSYNC- signal from the video disc in the upper left portion of the schematic. A J-K flip flop 414, which is a LS107 chip, provides VSEL and VSEL- pulse trains which are one-half the frequency of the VSYNC- pulse train. The VSEL output of the U14 is provided to the D-type flip flop U16, which is a 174 chip. The flip flop U16 also receives a 14 MHz clock signal from the computer (from OSC Pin B30 of FIG. 3B) and provides an output on its CLK1 pin which is ¼ the frequency of the 14MHz signal, or about 3.5 MHz.

This CLK1 signal is inverted by inverter U15 (a 7474 chip) and is provided to the counting input pin 1 of counter U11 which is arranged to operate as an 8-bit counter. The chip is actually two 4-bit counters, but the MSB of the lower 4-bit byte at pin 6 is connected to the counting input pin 13 of the higher 4-bit byte. The MSB of the upper 4-bit counter at pin 8 is connected to the counting input pin 1 of counter U12, which is likewise arranged as an 8-bit counter. The combination of U11 and U12 provide a 16 bit counter which counts increments of time in 0.286 microseconds (reciprocal of 3.5 MHz counting input). The respective outputs of the counters U11 and U12 are fed to latches U10 and U9, which latch and hold the counter output upon receiving an LPS-signal at their pins 11. When latched, this data becomes available on the lower byte and upper byte data lines D0-D7 of the latches only when the particular latch is addressed by address signals LPRDLB (light pen read lower byte) and LPRDUB (light pen read upper byte), respectively, on pins 1 of the latches. Thus, when so addressed, the byte of a latch is provided on data lines D0-D7 and to 8 pins of E1-E10 of chip U1 as shown on FIG. 3B.

To address the counter latches U10 and U9, an address decoder is provided by way of U13 which is a 138 chip. The address decoder receives three inputs A0-A2 from the computer on pins 1-3, which are from E14, E13 and E12 of line driver U5, which is a 244 chip (see FIG. 3B), and an I/0 decode input at its pin 5 from U4 chip in FIG. 3B. The address decoder will generate address signals on only one of its output pins 12-15 at any one time. This output pins are LPCLR (light pen clear reset), LPRDLB, LPRDUB and STATUS. The STATUS line addresses U8, which is a tri-state line driver available as a 244 chip, the line driver U8 also receives VSEL and VSEL- signals and an LPS signal and provides an indication at its output data lines D0, D1 and D3 on whether the light pen has triggered (from LPS) and the state of the vertical synch signal. The data lines from this line driver are also connected to 8 pins of E1-E10 of U1 as shown on FIG. 3B.

Also shown in FIG. 3A is the LPCLK- (light pen clock), which comes from pin 8 of the 8-pin connector of FIG. 2E, by way of a cable (not shown), one end of which is connected to the connector 122 of FIG. 2E, and the other end of which is connected to a connector like that shown on the bottom of FIG. 3A. The CPCLK- line is low when light is sensed by the pen and causes the latches to latch through OR gate U6, Schmitt trigger inverter U15 and JK flip flop U14. The JK flip flop U14 also receives the LPCLR- line, to reset the flip flop and enable a new setting of the flip flop the next time the light pen senses light. The LPS- line is connected to the digital I/0 line of FIG. 3C.

After the latches U10 and U11 are latched, a VSEL- signal provided to the counters U11 and U12 will reset them to zero to start a new count in response to a new vert synch signal.

Referring to FIG. 3B, an IBM prototype card is shown, along with a 62 pin layout for a port in an IBM PC-AT computer. The chips U1, U2, U3, U4 and U5 are connected to certain of the port pins A1-A31 or B1-B31 as indicated. The OSC of pin 30 of the port, which is the 14 MHz clock signal from the computer, is connected to pin 9 of chip U16 of FIG. 3A. The I/0 decode E11 is connected to pin 5 of U13 of FIG. 3A. Pins E14, E13 and E12, which are address lines, are connected to the address inputs A0, A1 and A2 of chip E13 of FIG. 3A. Lastly, pins E1, E3, E4, E6, E7, E8, E9 and E10 are connected to the data lines of all three of U10, U9 and U8 of FIG. 3A in bus fashion. Upon an address being provided from the computer to chip U5, a 3-bit address byte will be provided to U13 of FIG. 3A, which will decode the address and enable data read-out of one of the chips U10, U9 or U8. Upon being addressed, one of these latter three chips will present its data on its output data lines D0-D7 (for the case of U10 or U9) or D0, D1 and D3 (for the case of U8) which will then be provided, through chip U1, to the data lines A9-A2 of the computer port.

In the case of data from chips U10 and U9, the computer through its control program will compute the particular X-Y coordinate location on the display that the light pen was above (assuming the display was oriented in a horizontal plane) when it sensed light using the time data from these chips. In the preferred embodiment, the resolution is on the order of one character, which is usually sufficient for most applications. Of course, the resolution could be improved by means known to those skilled in the art.

FIG. 3C shows an analog to digital conversion (ADC) circuit for interfacing the light pen of the torch to the computer through its port. The ADC module is available through QUA TECH as a model no. ADM12-10 module and the parallel expansion board is available from QUA TECH as its model PXB-721. The ADC module converts analog values of light pen intensity (representing distance of the light pen from the screen) at the light pen terminal pin 2 (see FIG. 2E) and oxygen and acetylene valve positions (see pins 5 and 4, respectively, of FIG. 2E) and provides them to the computer port through the parallel expansion board. The 20° and 60° switch outputs of pins 1 an 3 of the torch (see FIG. 2E), while digital in nature, are also provided to the computer port through the ADC module. The programmable interface unit connects the digital I/0 line from U14 of FIG. 3A to the computer. The torch, in addition to being connected to the ADC module of FIG. 3C, is also connected to the circuitry of FIG. 3A, in particular the LPCLK- (from pin 8 of FIG. 2E) and the 5 VDC and ground connections (not shown).

The computer is controlled by a control program, the software listing of which is provided by way of microfiche filed herewith. The software listing is structured from the student's viewpoint by learning blocks which walk the student through various demonstrations of the welding components and operation through audio and video, allow student practice with the welding torch, quiz the student through both multiple choice questions and answers and hands-on simulation testing, and finishing with a certification testing which is a final testing of both multiple choice questions and hands-on simulation to test mastery of all the material presented in the earlier learning blocks. The content of each of the learning blocks will follow with reference to FIGS. 4A-4H. The learning blocks are entered by student selecting one of the blocks in the Choice Menu, which shows a small graphic of each of the learning blocks in a composite fashion on the display when the system is turned on, and is what is displayed after each learning block is completed or is shown by default after student inaction in any of the learning blocks for a predetermined time period.

LEARNING BLOCK NO. 1—POSITIVE ROLE MODEL

In this learning block, the student will be shown a complete setup, lighting of the torch, butt weld, and shutdown procedure. The student will be allowed to review this positive role model at any time during the instruction except during quiz and certification. When this learning block is entered, a star icon is shown in the top left corner of the display throughout the sequence, which when touched will cause the display to return to the Choice Menu. Graphics will also appear at the bottom of the screen in the form of a left pointing arrow, (indicating rapid backward motion without sound), a bar, (indicating normal speed with sound), and a right pointing arrow (indicating rapid forward without sound). These arrows and bar are responsive to student touching to play the learning block in the selected manner. The student can therefore advance backwards or forwards quickly to the desired spot in the learning block, and then commence normal play of the lesson.

Figure 4A:
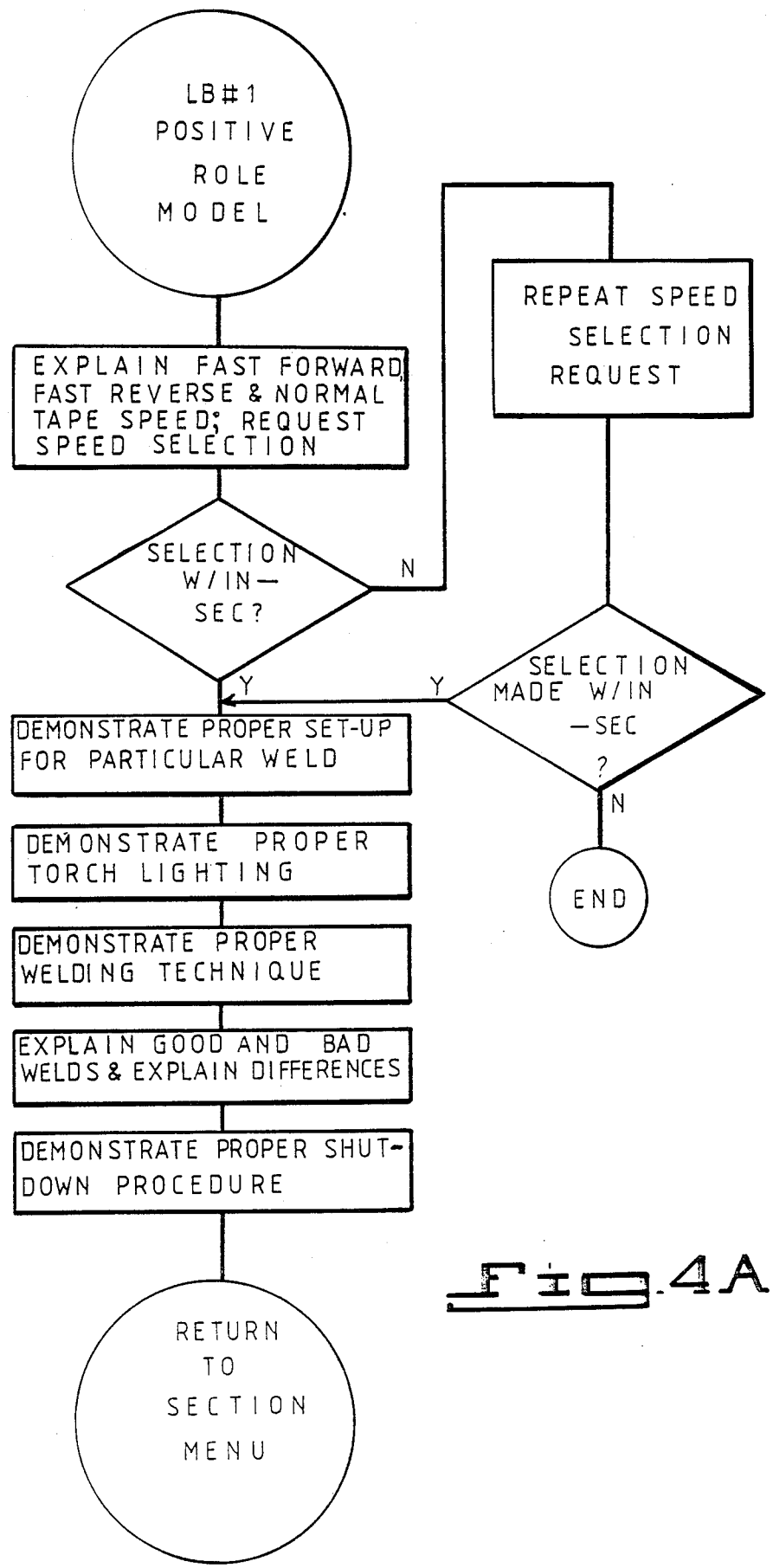
FIG. 4A is a flowchart of the control program for learning block #1 relating to a positive role model.

Turning now to FIG. 4A, this learning block explains the different speed selections just described and requests the student to select a given speed. If a selection is made within a certain time, the program progresses to the next step. However, if a selection is not made within a certain time, the speed selection request is repeated and the program awaits student response. If a selection is then made within a certain additional time period, the program progresses to the next step. If it is not, the program ends.

In the next step of the program, a proper setup procedure is demonstrated for a particular weld. In particular, the torch tip is selected for the particular thickness of metal being welded, and the metal pieces are placed as far apart as the are thick. All flammable material is removed from the welding area, and the bench and wooden floors are wet down with water. The student is then instructed about safety of clothing, welding goggles and fire extinguishers.

The oxygen and acetylene tanks are displayed as standing upright and chained, and the tank valves are closed tight. The student is requested to stand to the side to the regulators whenever making pressure adjustments of the valves, to avoid possible injury in case of valve blow-out. The demonstration continues by explaining the importance of closing the regulator adjustment valve by turning the handle until it is completely out, and that the acetylene torch needle valve is closed by finger pressure only. The tank valve is then opened one half of a turn and a check is made to see whether there is pressure in the tank sufficient for welding, above about 5 psi of acetylene. The working pressure of the acetylene regulator adjustment handle is turned clockwise until the pressure gauge shows a static pressure of 5 psi. The dynamic pressure is then set by opening the acetylene needle valve and readjusting the pressure backup to 5 psi. The acetylene torch needle valve is then closed. The oxygen regulator adjustment valve is turned until it is loose, meaning that it is closed. The oxygen torch needle valve is then finger closed. Standing to one side of the regulator, the tank valve handle is opened all of the way and a check is made to see whether there is sufficient pressure in the tank for welding, at least 10 psi of oxygen. The static working pressure is adjusted by turning the oxygen regulator adjustment handle clockwise until the working pressure gauge reads 10 psi. The dynamic pressure is then set by opening the oxygen needle valve and readjusting the pressure back up to 10 psi. The oxygen torch needle valve is then closed by finger tightening. All connections are then tested with soapy lather to catch any possible leaks in the system. This concludes the proper setup procedure.

The next step in the program is to demonstrate proper torch lighting. With the torch pointed away from the operator, the acetylene needle valve is opened to let a small amount of acetylene into the striker's cup and then the torch tip is raised over the top of the cup so that the torch gas is flowing over the cup and not into it. The striker then ignites the torch. Since this step is important, the program repeats this demonstration. The amount of acetylene is then increased and then oxygen is slowly added by turning the oxygen needle valve until a feather in the torch flame disappears, leaving only a small intense cone, thereby providing a neutral flame, meaning that there is not an excess of either oxygen or acetylene in the gas mixture. A proper welding rod is then selected to be the same type and thickness of metal as the pieces being welded and welding goggles are then put on. The welding torch is then picked up by the operator's right hand and held at a comfortable and proper angle relative to the workpiece, as was described above. A tacking of the two pieces of metal is done by forming tack points about ½ in from each end of the butt line to be welded. A tack is done by making a puddle with the torch, which is displayed on the screen, and then by adding a small drop of metal from the rod, as the operator demonstrates. The tacks serve to keep the two pieces of metal in the proper relationship during the weld and is performed correctly when the metal from the rod flows into both of the metal pieces. The cone of the welding torch is demonstrated to be about ¼ inch from the welding surface, which is the proper welding distance. The metal between the tack and the edge of the butt line is then heated to form a molten puddle and, as the torch makes small circling motions, metal from the rod is added. The welding material will then fill in the gap between the two metals to join them. Since this particular segment of the demonstration is important, it is automatically repeated. The welding operation is continued by circling the torch to ensure even heating of the metal, to push the puddle along the butt line, keeping the welding in the front part of the puddle, emphasizing that pushing of the puddle with the cone kept at a constant distance from the metal assures proper penetration.

The program then displays a split screen of a good weld and a bad weld describing that a good fusion weld should have a bead tapering off smoothly into the base metal with no oxide formed on the base metal close to the weld, and without formation of oxide, pits or distortion on the base metal. Examples of welds resulting from the torch being too close and too far away from the base metal, resulting respectively in hot and cold welds, are shown and described.

Lastly, the shut down procedure is then demonstrated. This includes finger tight closing of the acetylene at the needle valve, closing the oxygen needle valve, tightly closing the acetylene tank valve, closing the oxygen tank valve, and then opening the acetylene needle valve and oxygen needle valve to release pressure left in the system, and then closing these needle valves. The area is then cleaned up and tools are put away. The gauges are then checked after several minutes to confirm that no pressure is registered on the valves. If pressure does register, the above steps are repeated to shut the valves tightly and to bleed the system of residual pressure. When no pressure is in the system, the hoses are disconnected and the torch is put away.

This learning block is concluded by returning to the Section Menu so that another learning block can be selected.

LEARNING BLOCK NO. 2—COMPONENTS

Figure 4B:
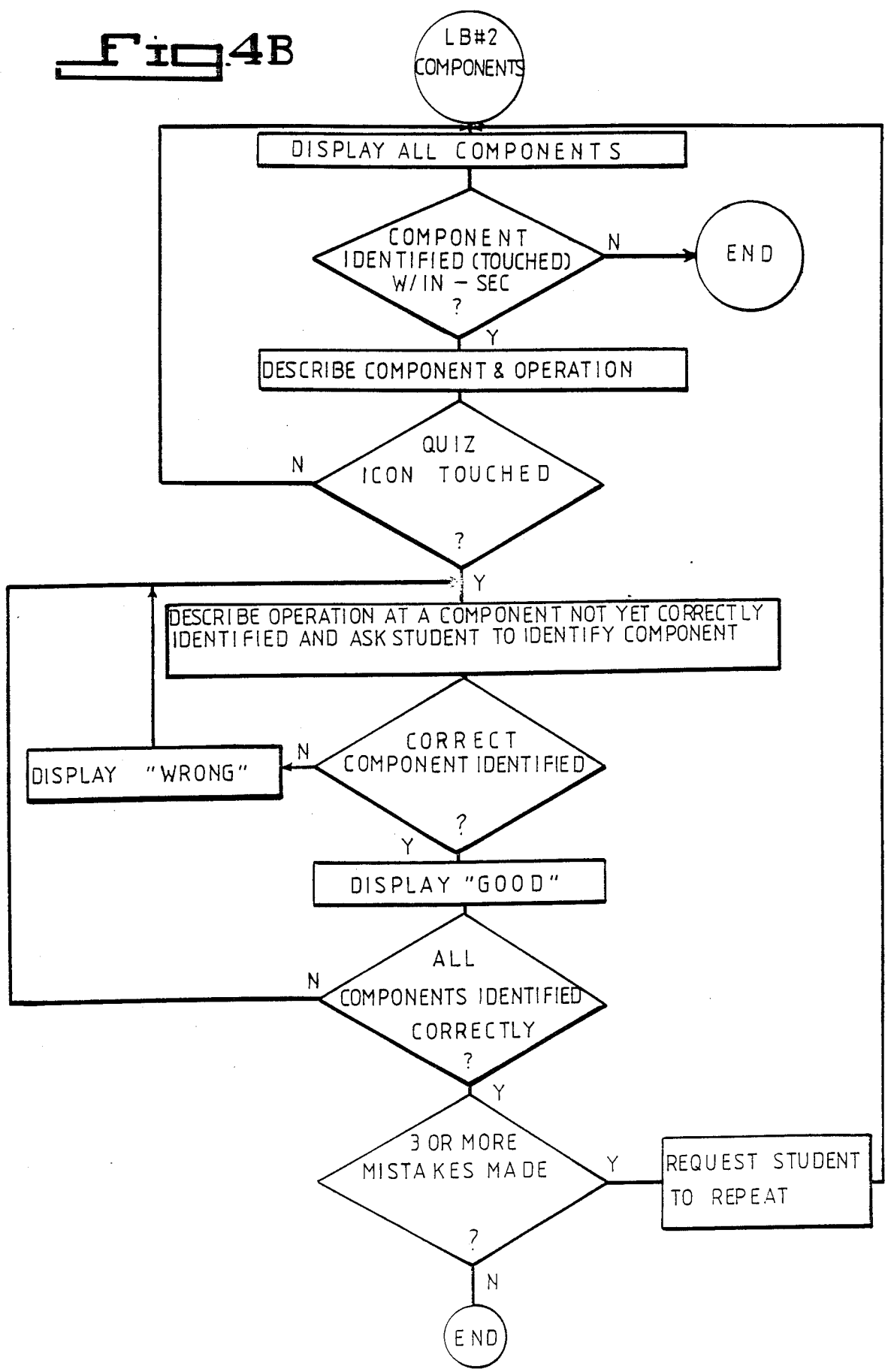
FIG. 4B is a flowchart of the control program for learning block #2 relating to welding components.

Referring now to the flowchart of FIG. 4B the program first causes all of the components of the welding system to be displayed on the screen in a split screen format. The student then touches one of the components on the screen, and in response thereto, audio is generated which describes the component in its operation. A component should be touched within a certain number of seconds otherwise the program automatically times out (i.e. returns to the Section Menu). The program then determines whether the quiz icon has been touched, indicating that the student now wishes to take a quiz to identify the components. If it is not touched, the system returns to the beginning of this learning block.

If and when the quiz icon is touched, the learning block then enters its quiz mode, wherein an operation of a component is described, and the student is asked to identify the described component by touching the screen. If the correct component is identified, the display so indicates. The program determines whether all of the components have been identified correctly. If not, the operation of another component not yet identified is described, and the student is asked to identify this component. If at any time the component is not identified correctly, the program so indicates, and the student will be asked to identify this misidentified component at some time later during the quiz. When all of the components have been identified correctly, the program determines how many mistakes were made during the identification process. If three or more mistakes were made, the student is requested to repeat the entire learning block. If less than three mistakes were made, the program ends by returning to the Section Menu.

LEARNING BLOCK NO. 3—GASES

Figure 4C:
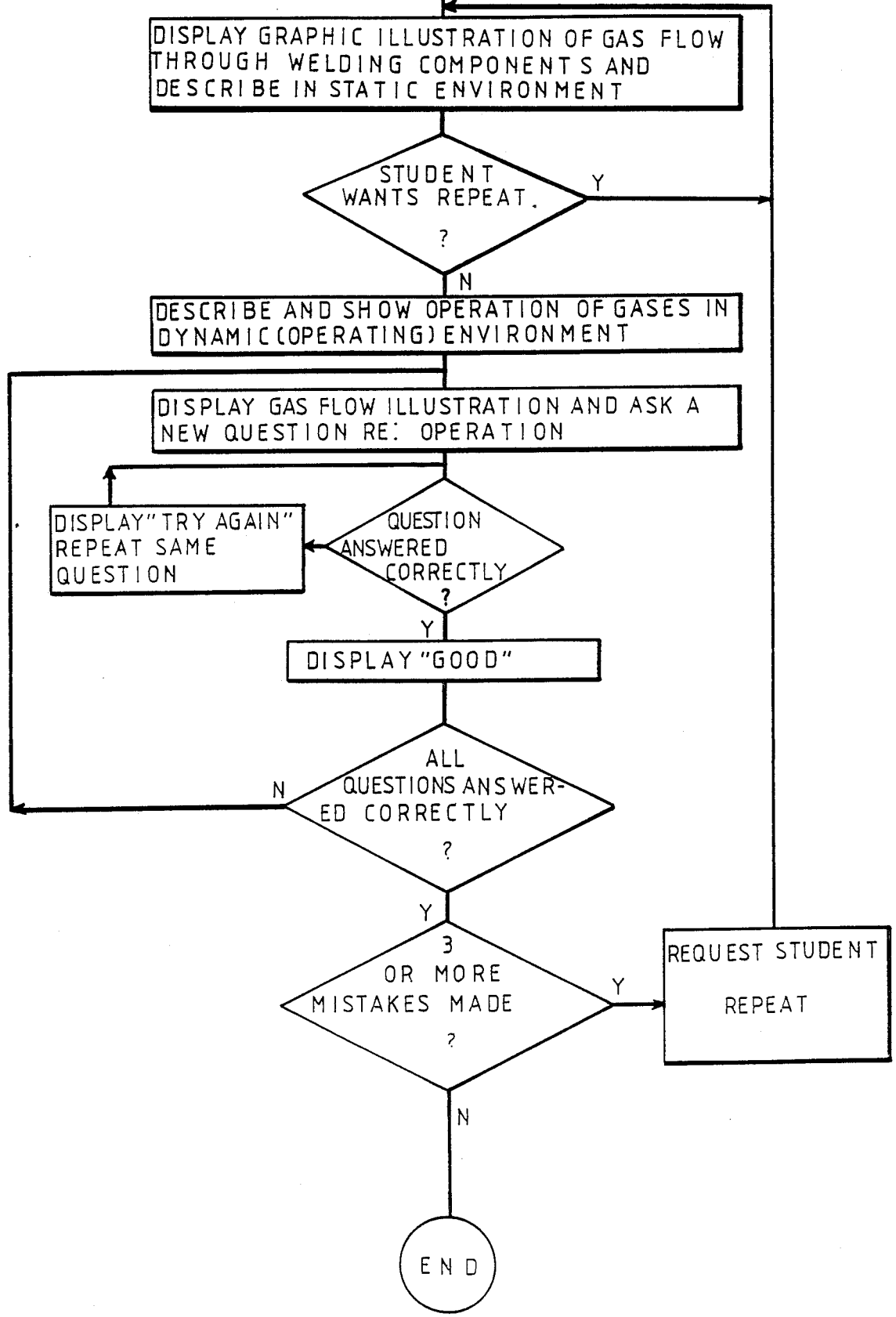
FIG. 4C is a flowchart of the control program for learning block #3 relating to flow of gases.
Figure 4D:
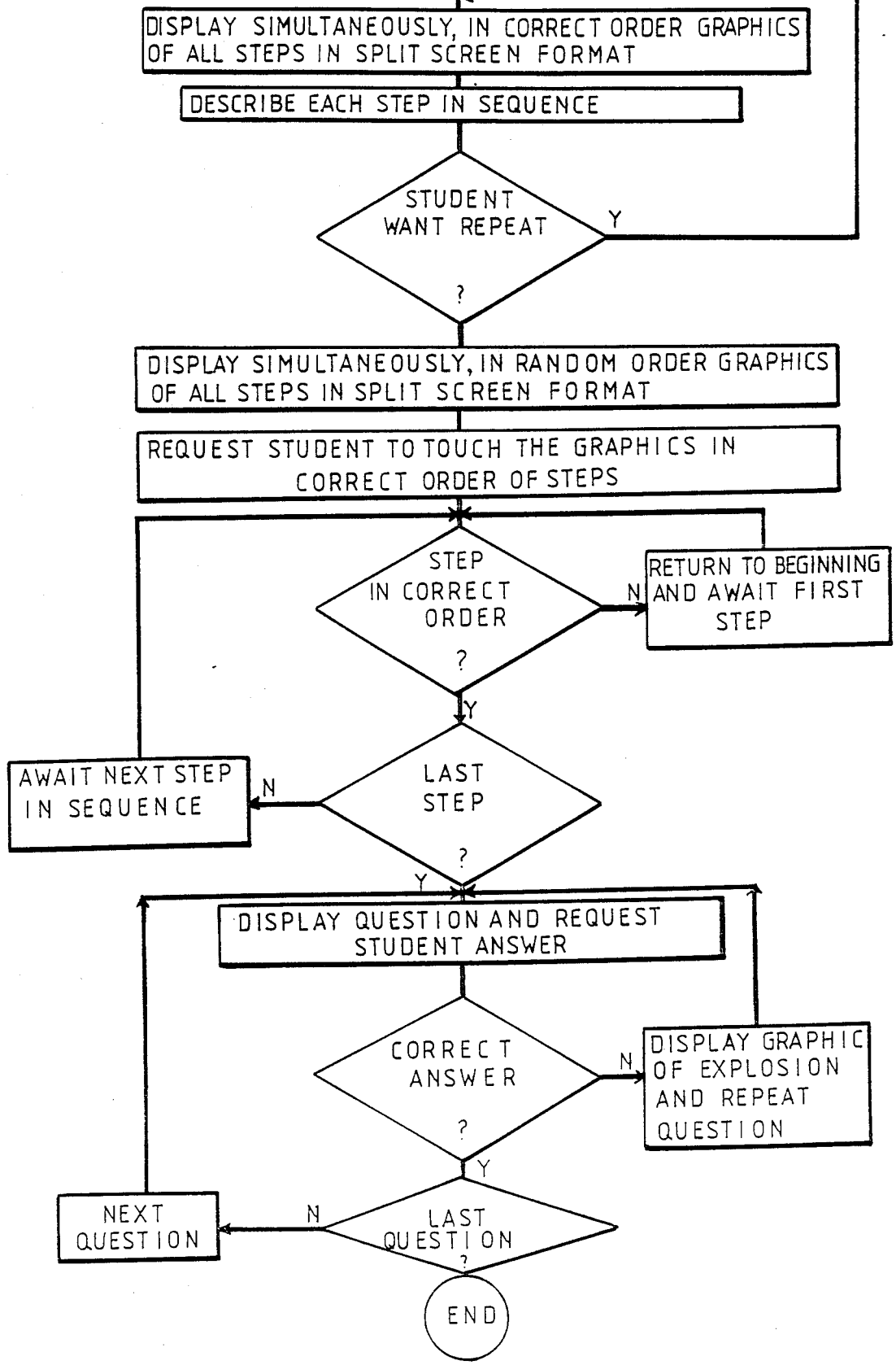
FIG. 4D is a flowchart of the control program for learning block #4 relating to set-up.

As shown in FIG. 4C, in this learning block, a graphic is displayed illustrating the gas flow through the welding components and an audio track describes the components in a static environment. The student may request the program to repeat this description if desired. If not, the program then describes and shows the operation of gases in a dynamic or operating environment. The learning block then displays a gas flow illustration and asks the student a new question regarding the operation. If the student answers the question correctly, the program so indicates, but if a question has not been answered correctly, the same question is repeated. Once all of the questions have been answered correctly, the program ends, unless three or more mistakes have been made in responding to questions. If so, the student is requested to repeat the learning block.

LEARNING BLOCK NO. 4—SETUP

According to this learning block as shown in FIG. 4C, the program displays simultaneously, in correct order, graphics of all of the steps in the setup procedure in split screen format. Each step in the setup procedure is then described in sequence. If the student wants the program to repeat this description, it will be done, otherwise the learning block enters the quiz mode, wherein the graphics of all of the steps are displayed simultaneously in split screen format, but in a random order. The student is requested to touch the graphics in the correct order of steps in the setup procedure. If the particular step being identified is correct, the program so indicates, otherwise the student must return to the beginning of the quiz and await the first step. When a correct step is identified, the student is then allowed to advance and identify the next step in the sequence. Once the entire setup procedure has been correctly completed upon reaching the last step, another quiz mode is entered into presenting questions to the student regarding the setup procedure. In this mode, a question is displayed and the program awaits for the student to answer by pressing the screen at the location of the correct answer from several choices. If an answer is correct, another question is presented. However, if the answer is incorrect, the program displays a graphic of an explosion, simulating what would happen if that mistake were made on real equipment, and the question is repeated. Once all of the questions have been answered correctly, the learning block ends.

LEARNING BLOCK NO. 5—SHUTDOWN

This learning block is designed in substantially the same manner as learning block no. 4 dealing with setup procedures, and thus the Figure for learning block no. 4 is applicable here. Generally, the system displays simultaneously, in correct order, graphics of all steps in split screen format and describes each step in sequence. For the quiz mode, graphics are displayed simultaneously of all steps in split screen format, but in random order. The student is requested to touch the graphics in the correct order of steps and the learning block is completed only when the student proceeds through the entire shutdown process without any mistakes. If a mistake is made, the student must return and start the shutdown procedure over.

LEARNING BLOCK NO. 6—LIGHTING THE TORCH AND ADJUSTING THE FLAME

Figure 4E:
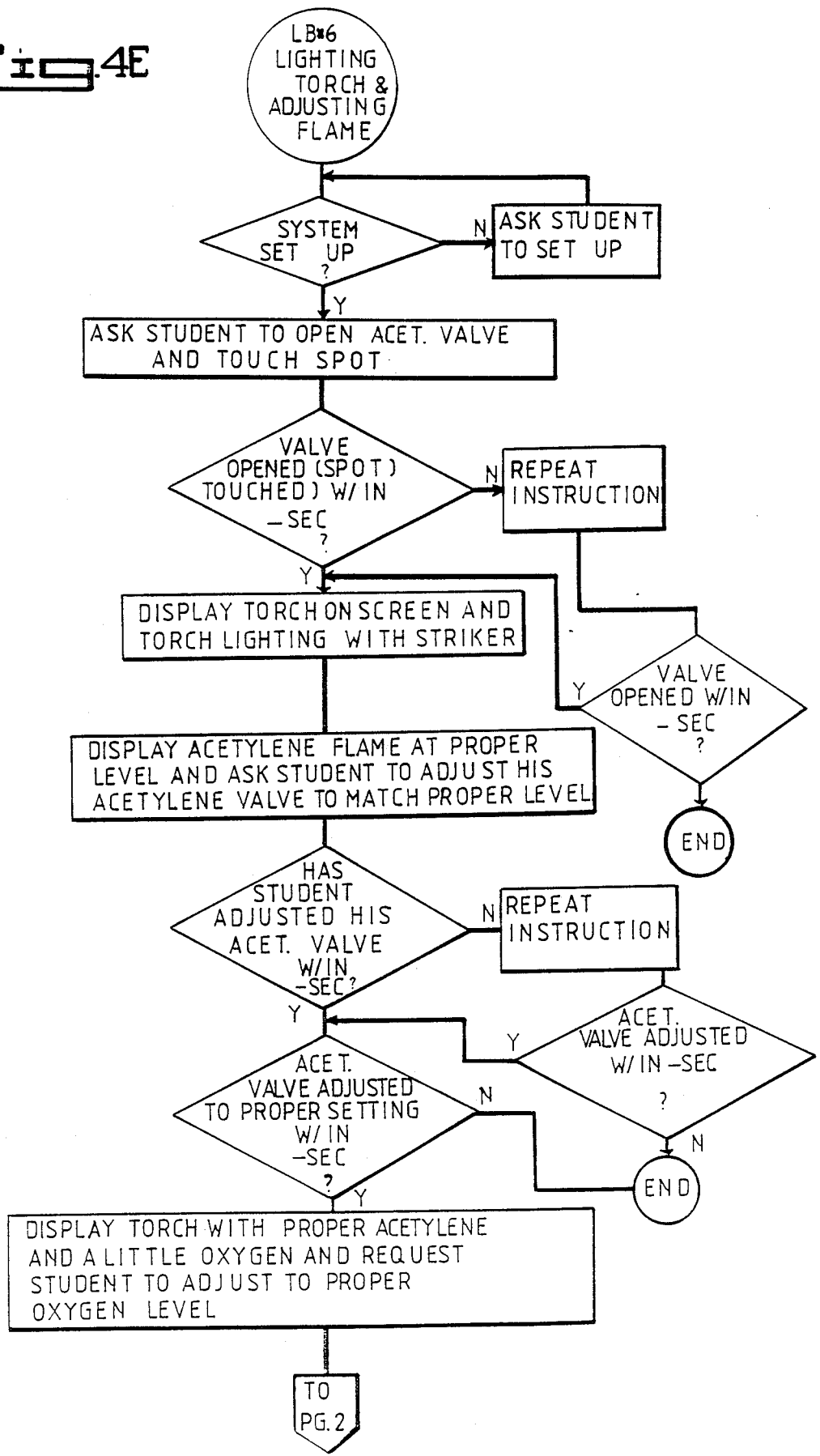
FIG. 4E is a flowchart of the control program for learning block #6 relating to torch lighting and adjustment.
Figure 4E:
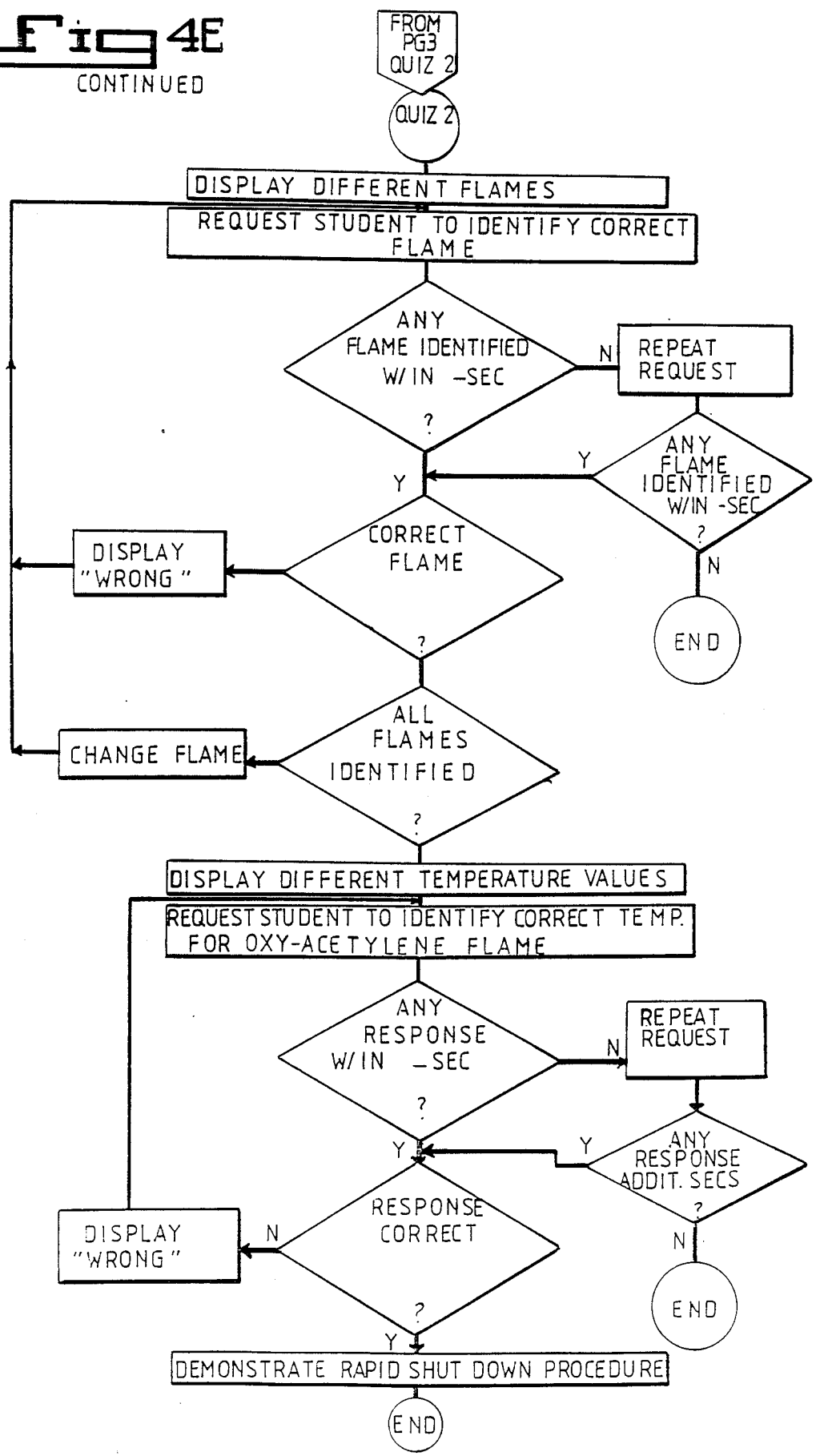

In this learning block, which is shown in FIG. 4E, the program checks to determine whether the system is setup, i.e., whether the torch is ready to be lit. If it is not, the student is asked to setup the system. Once the system is setup, the student is requested to open the acetylene valve and to touch a spot on the screen when so done. If the valve is not opened within a certain time, the instruction is repeated, after which if the valve is not opened within an additional time period the program ends. If the valve is opened within the original or additional time period, the torch is displayed on this screen and is lit with the striker in the correct manner. Since this is an important step, the lighting of the torch is automatically repeated. A student is cautioned never to use a match to light the torch.

An acetylene flame is then displayed at the proper level and the student is asked to adjust his acetylene valve to match the proper level. The program monitors the student's action on his torch simulator. If the acetylene valve is not adjusted within a certain time period, the instruction is repeated and if the valve is not adjusted within an additional time period, the program ends. If the acetylene valve has been adjusted, the program determines whether it has been adjusted to its proper setting within a certain time. If not, the program ends. If it has, the torch is displayed with the proper acetylene level with a small amount of oxygen.

The student is then requested to adjust the oxygen level to its proper level. If the student has not adjusted his oxygen valve within a certain time period, the instruction is repeated and if the valve has still not adjusted within an additional time period, the program ends. If the valve has been adjusted, the program determines whether the valve has been adjusted to its proper setting within a certain time period. If not, the program ends, but if it has, the program demonstrates the proper torch adjustment for different types of metals, eg. copper, stainless steel, aluminum or regular steel. The student is then instructed on proper system shutdown procedure and then the torch light up procedure is then reviewed, and continuing with proper shutdown procedure if the student requests. The learning phase of this learning block is complete and the student is then given an opportunity to take a quiz to test his understanding of the torch lighting procedures.

In the quiz mode, different steps of the torch lighting procedure are displayed in a scrambled menu on the screen, also including a review symbol so that the student can review the sequence again by pressing the symbol. The student is requested to touch the screen blocks in the correct sequence. If a step is not identified within a certain time period, the request is repeated and if no step is identified in this additional time period, the program ends. If the student wishes review, the program returns to the torch lighting menu format review which preceded the beginning of the quiz. If the step identified is a torch lighting step but it is not the correct step in the sequence, the display so indicates and the student is again requested to touch the blocks in the correct sequence. If the response is correct, the display so indicates and the program determines whether the last item in the step has been reached. If not, the student is requested to touch the remaining blocks in the correct sequence. After all of the steps have been identified in their proper sequence, the program goes to the second part of the quiz.

In the second part of the quiz, the program displays several different types of torch flames and the student is requested to identify the correct flame. If no flame is identified within a certain time period, the request is repeated, and if no flame is identified within an additional time period, the program ends. If the correct flame is identified within the original and additional time period, the program determines whether the flame identified is correct. If not, the display so indicates and the student is again requested to identify the correct flame. If the correct flame is identified, the student is requested to identify another type of flame. Once all of the flames have been identified, the display shows different temperature values and the student is requested to identify the correct temperature for an oxygen-acetylene flame. If their response is not correct within a certain time period, the request is repeated. When the response is correct, the program displays a rapid shutdown procedure and returns to the learning block choice menu.

LEARNING BLOCK NO. 7—PUDDLE SIMULATION

Figure 4F:
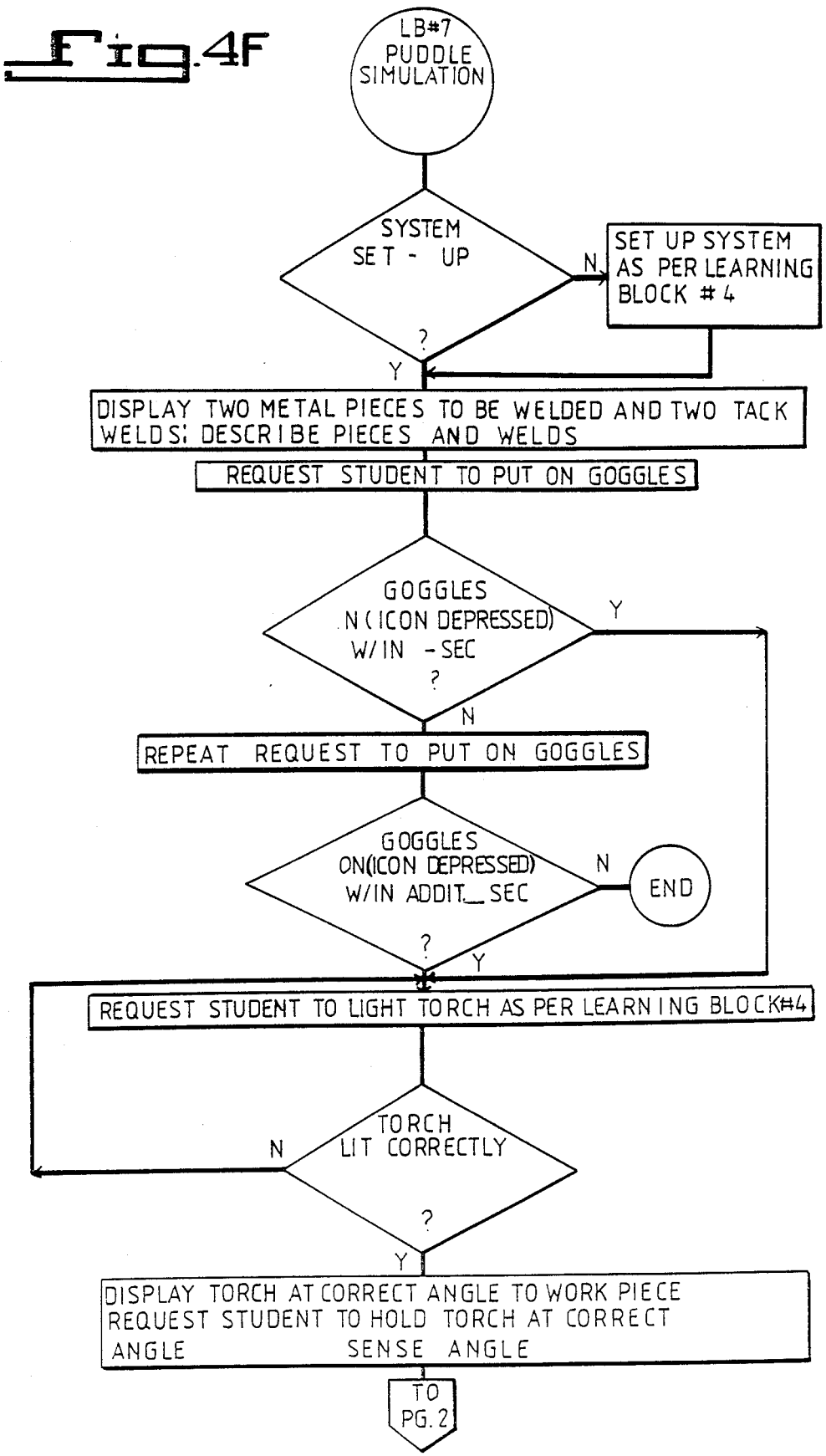
FIG. 4F is a flowchart of the control program for learning block #7 relating to puddle simulation.

In this learning block the student will receive a short introduction to metal fusion with appropriate visuals showing what happens in a butt weld procedure and how the penetration of the puddle is a key element of strong weld. Referring now to FIG. 4F, the program determines whether the system has been properly setup, and if not the system is setup as per learning block no. 4. After setup, two metal pieces to be welded are displayed along with two tack welds. The pieces and welds are described and the student is requested to put on the goggles and to so indicate when his goggles are on by pressing a star icon in the upper corner of the screen. This should be done within a certain time period or else the program times out and returns to the Choice Menu. If the icon is pressed within the proper time period, the student is requested to light the torch in accordance with learning block 4. If it is not lit correctly, the instruction is repeated. Upon correct lighting of the torch, the torch is displayed at a correct angle to the workpiece (as described above). The student is then requested to hold his own torch at the correct angle and the system determines whether this torch angle is correct by sensing the state of closure of the two mercury switches in the torch held by the student. The torch angle must be correct within a certain time period or else the program times out. The student is then requested to hold the torch at the correct distance (¼ of an inch) from the screen and the program displays in a circle where the puddle will occur. The program senses if the torch is at the correct distance from the screen by sensing information received from the light pen of the torch. If the torch is not at the correct distance, the student is requested to move the torch to the correct distance by telling the student that his torch is too close or too far. The torch must be at the correct distance within a certain time period or else the program times out.

The program then determines whether the torch is in the designated puddle area by sensing the location of the torch relative to the screen. If the torch is not within the puddle area, the program requests the student to correct the torch location which must be done within a certain time period or else the program times out. Once the torch location and distance are correct, the circle is replaced with a correct puddle size visual accompanied by a narrative as to the correct puddle size. The student is then requested to move the torch too far away and the puddle is then displayed smaller and colder in response thereto, with an explanation. The student is then requested to move the torch too close and the display then shows the puddle larger and hotter in response thereto.

The student is then requested to place the torch at the correct location, i.e. ¼ inch away from the screen. The program then checks to see whether the distance of the torch is at least within 1 inch from the screen within a certain time period. If not, the student is again requested to place the torch at the correct distance. If this is not done within an additional time period, the program times out.

If the torch position is correct, i.e. ¼ inch from the screen, the student is requested to move the torch forward and away from the screen. The display then shows the puddle size and location in response to the torch distance from the screen in order to provide the student with a real time display generation of puddle size in response to torch position. The student can practice this torch movement as long as he wishes. However, he must move the torch within a certain time period or else the instruction is repeated and then if no torch movement is sensed within an additional time period, the program times out. The student is requested to touch the icon displayed on the screen when he is ready to proceed to the next segment of the learning block. In addition to displaying appropriate puddle size in response to torch distance from the screen, the system will detect whether the torch is too close to the metal workpiece on the screen for a certain time period, of say one-half of a second, and if so, a simulation of an explosion will occur with sparks being displayed in a blowout of the display. An explanation is given as to why this occurred, after which the program returns above to initial instructions to place the torch at the correct distance from the screen. Similarly, if the torch is too far away from the metal workpiece for about one-half of a second, the puddle will cool down and an explanation is given as to why this occurred. The program will then return to the initial instructions to place the torch at the correct distance. The student can, during anytime of this puddle size simulation, proceed to the next part of the program by pressing the icon spot as discussed above.

Once the icon spot is pressed, the program enters into a welding simulation segment. The system displays the action of a correct torch movement for welding in the form of the torch moving in small circular motions, and also showing the resultant weld achieved thereby. The student is then requested to perform a correct weld in the top half of the display, with a display model of a finished correct weld in the bottom half of the screen. Circles are displayed graphically across the weld to indicate how the torch head should properly be moved to achieve the correct weld. The circles are then removed and an X is placed at the proper start point in the weld. The student is then requested to start the weld at X. The program then detects whether the student has placed his torch at the X point within a certain time period, and if not the instruction is repeated, with the program timing out if the student does not so commence within an additional time period.

At all times during this welding simulation, the system senses whether the torch is at the correct distance from the screen, whether the weld circling is too large or too small, and whether the welding rate rhythm, i.e. speed of the circling, is too fast or too slow. If torch movement is not correct in any one of the proceeding areas, appropriate remedial action is taken in the form of requesting the student to correct the problem with a display of the correct technique. Once the weld circling and rhythm are correct to form a complete weld, a quiz segment is entered into.

In the quiz segment, correct and incorrect torch angles are displayed in split screen format and the student is requested to identify the correct angle. A response must be given within a certain time period or else the program times out. If the response is not correct, the question is repeated. Once correct, correct and incorrect torch positions, i.e. location on the coordinates of the screen, is displayed in split screen format and the student is requested to identify the correct position by touching the display of the proper torch position. If the response is not correct the question is repeated. Once the question is answered properly, the screen then displays in split screen format torches which are too close and too far from the screen and the student is requested to identify where the torch would be for a cold and small puddle by touching the screen. If the response is incorrect the question is repeated. Once the question is answered correctly, the student is requested to identify where the torch would be for a hot and large puddle by touching the screen. Once this question is answered properly, the screen displays, in split screen format, welds with good and bad penetration and the student is requested to identify a good penetration weld by touching the screen. Once the question is answered correctly, the quiz is over and the program returns to the Section Menu format, concluding this learning block.

LEARNING BLOCK NO. 8—THE BUTT WELD

Figure 4G:
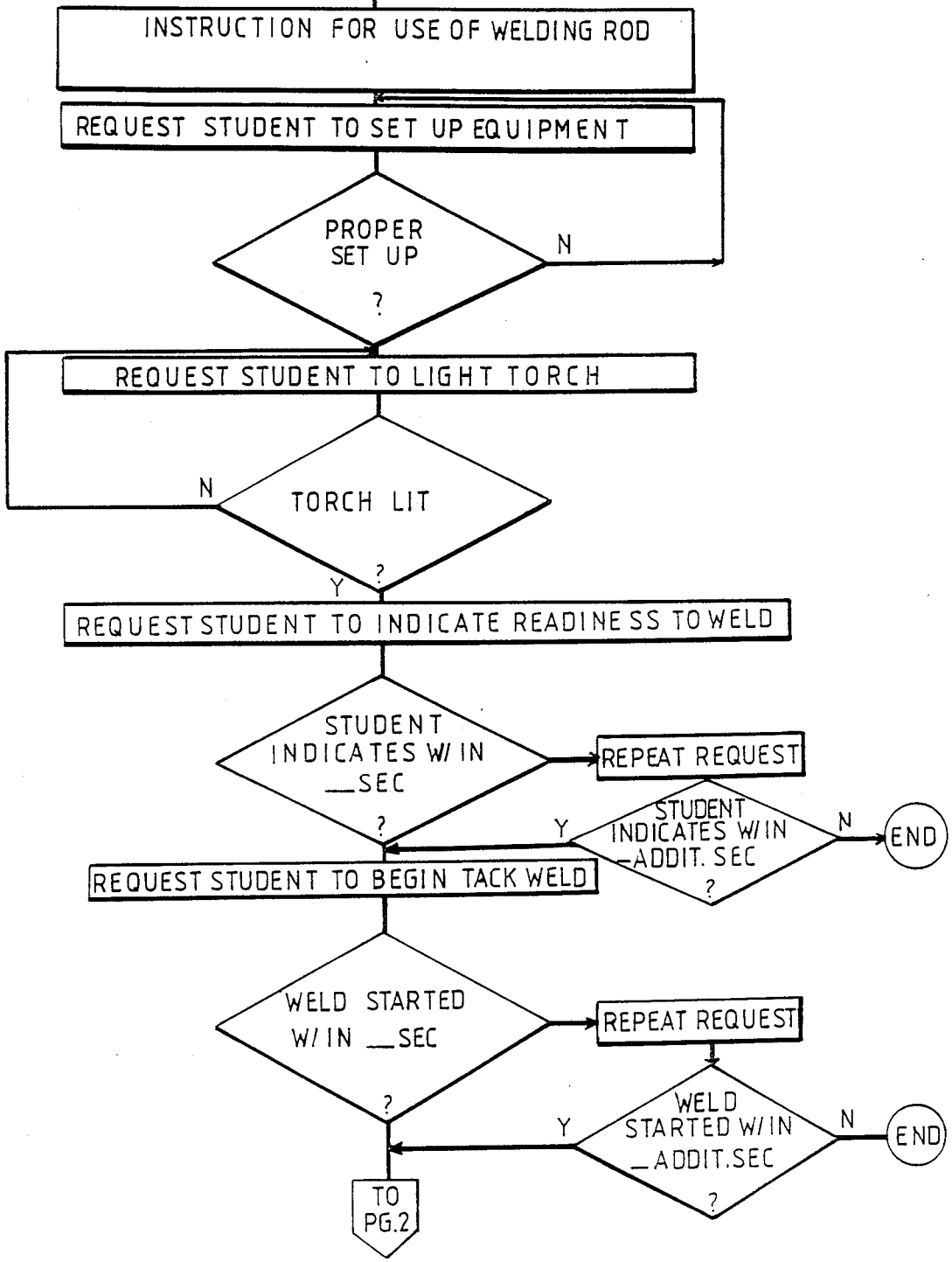
FIG. 4G is a flowchart of the control program for learning block #8 relating to butt weld.

Referring to FIG. 4G in this simulation, the student will be given instructions on the purpose and use of the welding rod, and will then be asked to use the rod with his left hand and perform a simulated butt weld. Self correction will be allowed by the student if the errors are slight and are less than one-half of a second. However, upon any major error or after one-half second of a noncorrected slight error, remediation will occur as described. The student may attempt this butt weld simulation as many times as he desires. Total mastery will be necessary to complete this learning block.

The learning block starts by instructing the student on proper use of the welding rod including selection of the type of metal, thickness, holding and positioning of the rod, particularly in the leading half of the puddle. The student is then requested to setup the equipment, going if necessary to the rapid setup sequence in another learning block and returning if the equipment is not yet setup. The student is then requested to light the torch, and goes to the lighting torch sequence in another learning block. The student is then requested to pick up the rod and to put on his welding goggles, and when ready to begin welding to touch the icon on the screen. If the icon is not touched within a certain time period, the instruction is repeated and is still not touched within an additional time period, the program times out.

If the student has touched the icon within the appropriate time period, the student is requested to begin a tack weld, meaning that the two pieces of metal are joined by two tack points near the edges of the space between the two pieces of metal to be welded. The tack weld must be started within a certain time period or else the instruction is repeated and the program times out if the weld is not started within an additional time period.

The system monitors action by the student for both tack spots. If only one tack spot is placed, the student is instructed to tack an additional spot. This should be completed within a certain time period or else the instruction is repeated and the program times out if not completed within an additional time period. Once the two tack spots have been placed, the student is requested to start a butt weld at a spot indicated on the screen. The instructions include holding the rod in the left hand and touching the screen with the rod end (so it will be sensed by the touch screen), with the torch at the correct angle and distance and the student's right hand, and making small circling motions as practiced earlier to create a puddle and move it across the weld joint. The circle is removed and, in response to torch and rod movement by the student, the screen will display a simulation of the weld based upon the parameters of torch angle, circling rate, circle widths, speed across weld, cone tip distance from puddle, rod position and torch position. Each of the values for the parameters are monitored for minor errors (i.e. whether a value is within an optimum range) and major errors (i.e. whether a value is within a workable range wider than the optimum range for the value). The student will be allowed to self correct any minor error which exists for less than one-half of a second without remedial action. However, for a major error, or any minor error exceeding one-half of a second, the system responds by displaying the proper technique for the particular parameter in error and requests the student to correct this error. If the error is not corrected within a half a second the instruction is repeated and the student is requested to start over. This monitoring continues until a three inch weld is completed correctly, whereupon a successful weld is indicated and the learning block is concluded.

LEARNING BLOCK NO. 9—CERTIFICATION

This is the learning block where the student puts together all of the skills that he has learned, and is basically a composite of different sections of the course. Total mastery of certain sequences will be required and the student will have to achieve mastery of these sequences without coaching. The student will, however, be allowed to try each task twice before the program returns to a review branch, and then out of the certification learning block and to the Choice Menu. In addition to the tasks, the student will be given several questions selected from the preceding learning blocks to answer. All of these questions must be answered correctly to receive certification. Although the star icon will appear in the top left of the screen in all of these questions, thereby appearing to allow an interruption by the student if desired, if the student touches the icon during this section he will receive a no interruptions allowed instruction. However, the student can leave the certification and try it later if he so chooses.

Total mastery of the following sequences will be required: components, flow of gases, setup, shutdown, lighting the torch and adjusting the flame, circling with the torch and butt welding. There will be a set number of questions asked, and all of these questions must be answered correctly. However, if the student passes the simulations part of the certification, and then fails the questions part, he may take the questions part over without having to do the simulations part, provided that he does so immediately.

Figure 4H:
FIG. 4 is a flowchart of the control program for learning block #9 relating to certification.
Figure 4H:
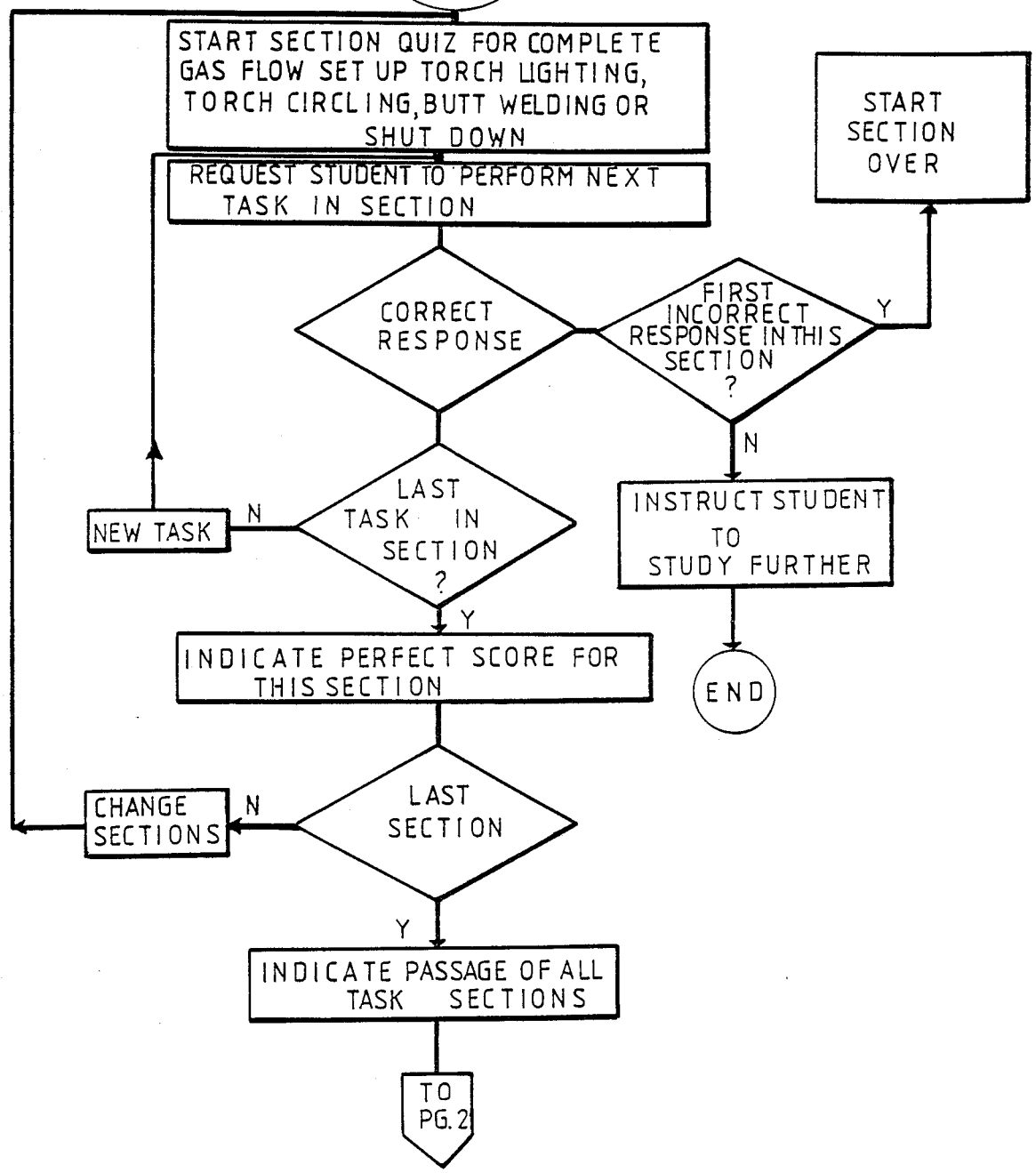

As shown in FIG. 4H, when the user selects the certification learning block, the system responds with general introductions and then starts with the master component touch graphic, wherein all of the components are displayed on the screen and the system audio asks the student to identify, by touching the screen, each component in turn. If a response is incorrect, the student is requested to start that particular section over. However, if it is the second incorrect response in this section, the student is instructed to study further and the certification learning block is exited and the program returns to the Section Menu. When all of the tasks are correctly performed by the student in a section, the score is indicated and the system advances to the next section. When all of the tasks or simulations are performed correctly in all of the sections, the system then leaves the simulation certification section and goes to the questions certification section.

In the questions section, the student is asked a question and requested to give his response by touching an appropriate location on the screen for his response. As in the simulations part of the certification, the student is allowed only one incorrect answer for the entire section before the certification learning block is exited and the student is instructed to study further. Upon successful completion and certification of both the simulations and questions parts, the display indicates successful conclusion and the program returns to the Section Menu.

A software listing of the control program, the overall flow diagrams of certain portions of which are shown in FIGS. 4A-4H, is provided by way of microfiche appendix hereto.

While a particular embodiment has been shown and described, numerous variations and modifications thereof will occur to those skilled in the art. For example the tool may be any type of tool or working implement such as a medical implement, with the corresponding display being the site of medical treatment which undergoes changes in response to movement of the implement, e.g. The scope of the invention is limited only by way of the following claims.

We claim:

1. A welding instructional system for simulating operations of a welding torch on a welding site, comprising:
   a welding torch simulator;
   display means for displaying images of the welding site;

location detection means responsive to the display means and the relative location of the torch and the display means for producing a location signal indicative of the relative location;

addressable memory means for storing information for generating, on said display means, different images of sequential stage of the welding site undergoing welding operation by the torch in dependence on said location signal; said addressable memory means also including audio visual instructions for demonstrating setup, welding and setdown techinques on said display means; and control means, including a computer and a control program, responsive to said location signal and the image currently displayed, for addressing said memory means to address the information used to generate images on said display means representative of changes between the welding site and said torch, said control means also selectively addressing said memory means to address the audio video instruction.

2. The system according to claim 1, wherein the location detection means comprises light detection means mounted in said torch for detecting light from said display means, wherein said relative location includes distance of the torch from the display means, and wherein the location signal is a signal whose amplitude indicates distance.

3. The system according to claim 1, further including a touch sensitive screen means, mounted on said display means, for sensing the position of a welding rod and wherein said control means addresses said memory means to generate images representative of changes in said workpiece by said welding rod position in response to a welding rod position signal from said screen means.

4. The screen according to claim 1, wherein the location detection means detects position of the torch projected onto the display means.

5. The system according to claim 1, wherein the torch includes means for detecting the angular orientation of the torch relative to the display means and wherein said control means addresses said memory means to generate images representative of said angular orientation.

6. The system according to claim 1, wherein the addressable memory means stores information for generating different images of sequential stages of said welding site undergoing correct operation thereon by said torch for providing a role model for an individual when the correct operation is displayed in response to the control means addressing the states of correct operation.

7. The system according to claim 1, wherein the location detection means detects the distance of the welding torch from the display means, angle of the welding torch relative to the display means and position of the torch projected onto the display means, and wherein a welding rod is provided with means for sensing the position of the welding rod on the display means, and wherein the control means monitors the parameters of torch distance, torch position, rod position, torch angle, torch circling rate, torch circling width and torch movement across the welding site, and addresses the memory means to address the information used for generating images on the display means representative of changes on said workpiece by said tool operation thereon and in response to said parameters.

8. A welding instructional system for simulating operations of a welding torch on a welding site, comprising:
a welding torch simulator;
display means for displaying images of a welding site;
location detection means responsive to the display means and the relative location of the torch and the display means for producing a location signal indicative of the relative location;
addressable memory means for storing information for generating, on said display means, different images of sequential stages of the welding site undergoing welding operation by the torch in dependence on said location signal;
control means responsive to said location signal and the image currently displayed, for addressing said memory means to address the information used to generate images on said display means representative of changes between the welding site and said torch; and
valve simulation means for simulating oxygen and acetylene valves and for providing signals representative of the valve positions, and wherein said control means addresses said memory means to generate images on the display means to simulate a torch flame which would result from said valve positions.

9. The system according to claim 8, wherein the valve simulation means comprises potentiometers which provide analog voltage signals whose amplitudes are representative of the valve openings and including means for converting the analog voltage signals to digital signals for use by the control means.

10. A welding instructional system for simulating operations of a welding torch on a welding site, comprising:
a welding torch simulator;
a display means for displaying images of a welding site;
location detection means responsive to the display means and the relative location of the torch and the display means for producing a location signal indicative of the relative location;
addressable memory means for storing information for generating, on said display means, different images of sequential stages of the welding site undergoing welding operation by the torch in dependence on said location signal; and
control means, responsive, to said location signal and the image currently displayed, for addressing said memory means to address the information used to generate images on said display means representative of changes between the welding site and said torch;
said location detection means detecting the distance of the welding torch from the display means, angle of the welding torch relative to the display means and position of the torch projected onto the display means, and wherein a welding rod is provided with means for sensing the position of the welding rod on the display means, and wherein the control means monitors the parameters of torch distance, torch position, rod position, torch angle, torch circling rate, torch circling width and torch movement across the welding site, and addresses the memory means to address the information used for generating images on the display means representative of changes on said workpiece by said tool operation thereon and in responses to said parameters.

11. The system according to claim 10, wherein the control means compares at least one of the parameter values to an optimum range of values, and to a wider workable range and causes a message to be given audibly or visually to an individual in response to a value exceeding the optimum range but within the workable range for more than a certain time period, or a valve exceeding the workable range.

12. A welding instructional system for simulating operations of a welding torch on a welding site, comprising:

a welding torch simulator;

display means for displaying images of a welding site;

location detection means responsive to the display means and the relative location of the torch and the display means for producing a location signal indicative of the relative location;

addressable memory means for storing information for generating, on said display means, different images of sequential stages of the welding site undergoing welding operation by the torch in dependence on said location signal; and control means, responsive to said location signal and the image currently displayed, for addressing said memory means to address information used to generate images on said display means representative of changes between the welding site and said torch;

said display means being refreshed periodically in a raster scan manner, herein the location detection means comprises a fiber optic cable mounted in said torch for detecting light from said display means, and including counting means for detecting, during a raster scan, the period of time between the beginning of the raster scan and when a fiber optic cable detects light, said period indicating the position of the torch.

13. The system according to claim 12 further including valve simulation means for simulating oxygen and acetylene valves and for providing signals representative of the valve positions, and wherein said control means addresses said memory means to generate images on the display means to simulate a torch flame which would result from said valve positions.

14. The system according to claim 13, wherein the valve simulation means comprises potentiometers which provide analog voltage signals whose amplitudes are representative of the valve openings and including mean for converting the analog voltage signals to digital signals for use by the control means.

* * * * *

UNITED STATES PATENT AND TRADEMARK OFFICE
CERTIFICATE OF CORRECTION

PATENT NO. : 4,867,685                                    Page 1 of 3

DATED : September 19, 1989

INVENTOR(S) : George W. Brush et al.

It is certified that error appears in the above-identified patent and that said Letters Patent is hereby corrected as shown below:

First page, line 5 of ABSTRACT, "as real" should read --a real-- AND "values" should read --valves--;

Col. 1, line 59, "This" should read --Thus--;

Col. 3, line 25, "stimulation" should read --simulation--;

Col. 3, line 44, "desire" should read --desired--;

Col. 4, line 45, "FIG. 4" should read --FIG. 4H--;

Col. 5, line 56, "used" should read --uses--;

Col. 6, line 68, "pots" should read --ports--;

Col. 7, line 39, "414" should read --U14--;

Col. 7, line 57, "provide" should read --provides--;

Col. 8, line 11, "This" should read --These--;

Col. 9, line 15, "an" should read --and--;

Col. 10, line 13, "the" should read --they--;

Col. 12, line 43, "4C" should read --4D--;

UNITED STATES PATENT AND TRADEMARK OFFICE
CERTIFICATE OF CORRECTION

PATENT NO. : 4,867,685
DATED : September 19, 1989
INVENTOR(S) : George W. Brush et al.

It is certified that error appears in the above-identified patent and that said Letters Patent is hereby corrected as shown below:

Col. 16, line 22, "proceeding" should read --preceding--;

Col. 17, line 12, "is still" should read --if still--;

Col. 19, line 36, "screen" should read --system--;

Col. 20, line 34, "a display" should read --display--;

Col. 20, line 45, delete the comma after "responsive";

Col. 20, line 65, "responses" should read --response--;

UNITED STATES PATENT AND TRADEMARK OFFICE
CERTIFICATE OF CORRECTION

PATENT NO. : 4,867,685

DATED : September 19, 1989

INVENTOR(S) : George W. Brush, et al

It is certified that error appears in the above-identified patent and that said Letters Patent is hereby corrected as shown below:

Col. 22, line 4, "herein" should read --wherein--;

Signed and Sealed this

Twenty-eighth Day of August, 1990

*Attest:*

HARRY F. MANBECK, JR.

*Attesting Officer*   *Commissioner of Patents and Trademarks*